(12) United States Patent  
Sampath

(10) Patent No.: US 9,125,078 B2  
(45) Date of Patent: Sep. 1, 2015

(54) METHOD AND APPARATUS FOR SETTING REVERSE LINK CQI REPORTING MODES IN WIRELESS COMMUNICATION SYSTEM

(71) Applicant: QUALCOMM Incorporated, San Diego, CA (US)

(72) Inventor: Hemanth Sampath, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 14/033,322

(22) Filed: Sep. 20, 2013

(65) Prior Publication Data

US 2014/0022946 A1   Jan. 23, 2014

Related U.S. Application Data

(63) Continuation of application No. 13/082,136, filed on Apr. 7, 2011, now Pat. No. 8,599,712, which is a continuation of application No. 12/091,482, filed as application No. PCT/US2006/042302 on Oct. 27, 2006, now Pat. No. 7,924,800.

(60) Provisional application No. 60/731,037, filed on Oct. 27, 2005.

(51) Int. Cl.
*H04W 24/02* (2009.01)
*H04W 52/14* (2009.01)
(Continued)

(52) U.S. Cl.
CPC ............... *H04W 24/02* (2013.01); *H04B 7/216* (2013.01); *H04L 5/0057* (2013.01);
(Continued)

(58) Field of Classification Search
CPC ... H04W 24/02; H04W 52/146; H04W 52/16; H04W 52/325; H04W 52/48; H04W 52/58; H04W 72/085; H04W 72/0473; H04B 7/216; H04B 7/2628; H04L 27/2601; Y02B 60/44
USPC .......................................... 370/252, 342, 479
See application file for complete search history.

(56) References Cited

U.S. PATENT DOCUMENTS 5,021,777 A  6/1991 Gross et al.
5,196,728 A  3/1993 Jaux
(Continued)

FOREIGN PATENT DOCUMENTS

CA    2340201 A1    1/2001
CN    1346580 A     4/2002
(Continued)

OTHER PUBLICATIONS

Xiao Y, "Orthogonal Frequency Division Multiplexing Modulation and Inter-Carrier Interference Cancellation", Thesis submitted to the Graduate Faculty of the Louisiana State University and Agricultural and Mechanical College in partial fulfillment of the requirements for the degree of Master of Science in Electrical Engineering, May 2003, pp. 1-53.
(Continued)

*Primary Examiner* — Paul H Masur
(74) *Attorney, Agent, or Firm* — Dalei Dong

(57) ABSTRACT

A method and apparatus for setting Reverse Link CQI Reporting Modes in an access terminal is provided, comprising determining a value for CQIReportingMode received as a parameter in a transmitted message and setting the reverse link CQI reporting mode of the access terminal based on CQIReportingMode value. The CQIReportingMode value is indicative of a reporting mode selected from a plurality of reporting modes.

17 Claims, 6 Drawing Sheets

(51) Int. Cl.

| | | |
|---|---|---|
| *H04W 52/16* | (2009.01) | |
| *H04W 52/32* | (2009.01) | |
| *H04W 52/48* | (2009.01) | |
| *H04W 52/58* | (2009.01) | |
| *H04W 72/08* | (2009.01) | |
| *H04B 7/216* | (2006.01) | |
| *H04L 5/00* | (2006.01) | |
| *H04L 27/26* | (2006.01) | |
| *H04W 72/04* | (2009.01) | |
| *H04B 7/26* | (2006.01) | |
| *H04J 13/00* | (2011.01) | |

(52) U.S. Cl.
CPC ............ *H04W 52/146* (2013.01); *H04W 52/16* (2013.01); *H04W 52/325* (2013.01); *H04W 52/48* (2013.01); *H04W 52/58* (2013.01); *H04W 72/085* (2013.01); *H04B 7/2628* (2013.01); *H04J 13/00* (2013.01); *H04L 27/2601* (2013.01); *H04W 72/0473* (2013.01); *Y02B 60/44* (2013.01)

(56) References Cited

U.S. PATENT DOCUMENTS

| | | | |
|---|---|---|---|
| 5,267,261 A | 11/1993 | Blakeney et al. |
| 5,276,911 A | 1/1994 | Levine et al. |
| 5,289,527 A | 2/1994 | Tiedemann, Jr. |
| 5,363,426 A | 11/1994 | Nyhart |
| 5,406,613 A | 4/1995 | Peponides et al. |
| 5,490,139 A | 2/1996 | Baker et al. |
| 5,619,492 A | 4/1997 | Press et al. |
| 5,640,414 A | 6/1997 | Blakeney et al. |
| 5,678,192 A | 10/1997 | Paavonen et al. |
| 5,719,562 A | 2/1998 | Fawcett |
| 5,802,467 A | 9/1998 | Salazar et al. |
| 5,815,507 A | 9/1998 | Vinggaard et al. |
| 5,818,825 A | 10/1998 | Corrigan et al. |
| 5,818,842 A | 10/1998 | Burwell et al. |
| 5,825,752 A | 10/1998 | Fujimori et al. |
| 5,878,033 A | 3/1999 | Mouly |
| 5,913,168 A | 6/1999 | Moreau et al. |
| 5,946,292 A | 8/1999 | Tsujishita et al. |
| 5,982,758 A | 11/1999 | Hamdy |
| 6,006,073 A | 12/1999 | Glauner et al. |
| 6,011,978 A | 1/2000 | Ault et al. |
| 6,012,160 A | 1/2000 | Dent |
| 6,038,220 A | 3/2000 | Kang et al. |
| 6,047,189 A | 4/2000 | Yun et al. |
| 6,088,345 A | 7/2000 | Sakoda et al. |
| 6,115,667 A | 9/2000 | Nakamura |
| 6,118,767 A | 9/2000 | Shen et al. |
| 6,119,005 A | 9/2000 | Smolik |
| 6,128,290 A | 10/2000 | Carvey |
| 6,138,034 A | 10/2000 | Willey |
| 6,144,841 A | 11/2000 | Feeney |
| 6,144,861 A | 11/2000 | Sundelin et al. |
| 6,154,659 A | 11/2000 | Jalali et al. |
| 6,157,621 A | 12/2000 | Brown et al. |
| 6,167,248 A | 12/2000 | Hamalainen et al. |
| 6,169,768 B1 | 1/2001 | Okada et al. |
| 6,175,550 B1 | 1/2001 | Van Nee |
| 6,175,557 B1 | 1/2001 | Diachina et al. |
| 6,181,738 B1 | 1/2001 | Chheda et al. |
| 6,181,768 B1 | 1/2001 | Berliner |
| 6,208,699 B1 | 3/2001 | Chen et al. |
| 6,212,175 B1 | 4/2001 | Harsch |
| 6,216,004 B1 | 4/2001 | Tiedemann, Jr. et al. |
| 6,229,800 B1 | 5/2001 | Thompson et al. |
| 6,249,681 B1 | 6/2001 | Virtanen |
| 6,252,865 B1 | 6/2001 | Walton et al. |
| 6,266,529 B1 | 7/2001 | Chheda |
| 6,272,335 B1 | 8/2001 | Nakayama et al. |
| 6,278,882 B1 | 8/2001 | Choi |
| 6,300,864 B1 | 10/2001 | Willey |
| 6,307,846 B1 | 10/2001 | Willey |
| 6,320,855 B1 | 11/2001 | Shi |
| 6,359,900 B1 | 3/2002 | Dinakar et al. |
| 6,360,100 B1 | 3/2002 | Grob et al. |
| 6,366,779 B1 | 4/2002 | Bender et al. |
| 6,369,447 B2 | 4/2002 | Mori |
| 6,389,034 B1 | 5/2002 | Guo et al. |
| 6,393,295 B1 | 5/2002 | Butler et al. |
| 6,421,540 B1 | 7/2002 | Gilhousen et al. |
| 6,446,236 B1 | 9/2002 | McEwen et al. |
| 6,473,467 B1 | 10/2002 | Wallace et al. |
| 6,477,361 B1 | 11/2002 | LaGrotta et al. |
| 6,480,504 B1 | 11/2002 | Wang et al. |
| 6,483,826 B1 | 11/2002 | .ANG.kerberg |
| 6,493,338 B1 | 12/2002 | Preston et al. |
| 6,519,705 B1 | 2/2003 | Leung |
| 6,532,227 B1 | 3/2003 | Leppisaari et al. |
| 6,535,736 B1 | 3/2003 | Balogh et al. |
| 6,539,030 B1 | 3/2003 | Bender et al. |
| 6,560,774 B1 | 5/2003 | Gordon et al. |
| 6,563,807 B1 | 5/2003 | Kim et al. |
| 6,570,915 B1 | 5/2003 | Sweitzer et al. |
| 6,571,084 B1 | 5/2003 | Jabbary |
| 6,577,608 B1 | 6/2003 | Moon et al. |
| 6,580,726 B1 | 6/2003 | Kumpf et al. |
| 6,597,705 B1 | 7/2003 | Rezaiifar et al. |
| 6,597,923 B1 | 7/2003 | Vanghi et al. |
| 6,603,746 B1 | 8/2003 | Larijani et al. |
| 6,625,198 B1 | 9/2003 | Tiedemann, Jr. et al. |
| 6,628,956 B2 | 9/2003 | Bark et al. |
| 6,633,554 B1 | 10/2003 | Dalal |
| 6,643,520 B1 | 11/2003 | Park et al. |
| 6,650,873 B1 | 11/2003 | Chen et al. |
| 6,684,080 B1 | 1/2004 | Barnes et al. |
| 6,687,285 B1 | 2/2004 | Jou |
| 6,711,150 B1 | 3/2004 | Vanghi |
| 6,714,511 B1 | 3/2004 | Sudo et al. |
| 6,721,373 B1 | 4/2004 | Frenkel et al. |
| 6,728,300 B1 | 4/2004 | Sarkar et al. |
| 6,731,943 B1 | 5/2004 | McCormick et al. |
| 6,754,229 B1 | 6/2004 | Islam et al. |
| 6,788,937 B1 | 9/2004 | Willenegger et al. |
| 6,795,425 B1 | 9/2004 | Raith |
| 6,807,164 B1 | 10/2004 | Almgren et al. |
| 6,813,252 B2 | 11/2004 | Chang et al. |
| 6,813,269 B1 | 11/2004 | Clougherty et al. |
| 6,823,192 B2 | 11/2004 | Jou et al. |
| 6,829,493 B1 | 12/2004 | Hunzinger |
| 6,842,619 B2 | 1/2005 | Lee et al. |
| 6,850,499 B2 | 2/2005 | Wheatley, III et al. |
| 6,888,805 B2 | 5/2005 | Bender et al. |
| 6,928,293 B2 | 8/2005 | Park et al. |
| 6,937,700 B1 | 8/2005 | Jang |
| 6,944,146 B1 | 9/2005 | Barany et al. |
| 6,950,669 B2 | 9/2005 | Simonsson |
| 6,952,591 B2 | 10/2005 | Budka et al. |
| 6,963,540 B2 | 11/2005 | Choi et al. |
| 6,967,936 B1 | 11/2005 | Laroia et al. |
| 6,996,131 B1 | 2/2006 | Islam et al. |
| 6,996,391 B2 | 2/2006 | Hunzinger |
| 7,006,477 B1 | 2/2006 | Balachandran et al. |
| 7,046,966 B2 | 5/2006 | Davis |
| 7,058,031 B2 | 6/2006 | Bender et al. |
| 7,072,307 B2 | 7/2006 | Tong et al. |
| 7,099,299 B2 | 8/2006 | Liang et al. |
| 7,110,391 B1 | 9/2006 | Rogers et al. |
| 7,139,575 B1 | 11/2006 | Chen et al. |
| 7,197,692 B2 | 3/2007 | Sutivong et al. |
| 7,203,512 B2 | 4/2007 | Jeong et al. |
| 7,212,831 B2 | 5/2007 | Lee |
| 7,224,993 B2 | 5/2007 | Meyers et al. |
| 7,233,625 B2 | 6/2007 | Ma et al. |
| 7,257,760 B2 | 8/2007 | Rick et al. |
| 7,313,167 B2 | 12/2007 | Yoon et al. |
| 7,313,398 B1 | 12/2007 | Ramahi |
| 7,320,003 B2 | 1/2008 | Perry et al. |
| 7,336,953 B2 | 2/2008 | Kim et al. |
| 7,340,615 B2 | 3/2008 | Krantz et al. |

(56) References Cited

U.S. PATENT DOCUMENTS

| | | |
|---|---|---|
| 7,342,901 B1 | 3/2008 | Zhang et al. |
| 7,383,432 B1 | 6/2008 | Barnes et al. |
| 7,403,528 B2 | 7/2008 | Hu et al. |
| 7,415,041 B2 | 8/2008 | Harris |
| 7,420,939 B2 | 9/2008 | Laroia et al. |
| 7,453,849 B2 | 11/2008 | Teague et al. |
| 7,466,665 B2 | 12/2008 | Calcev et al. |
| 7,496,058 B2 | 2/2009 | Kim et al. |
| 7,522,631 B1 | 4/2009 | Brown et al. |
| 7,522,919 B2 | 4/2009 | Yoon et al. |
| 7,567,826 B2 | 7/2009 | Sugaya |
| 7,590,095 B2 | 9/2009 | Chen et al. |
| 7,590,708 B2 | 9/2009 | Hsu |
| 7,596,127 B1 | 9/2009 | May et al. |
| 7,620,018 B2 | 11/2009 | Tee et al. |
| 7,668,125 B2 | 2/2010 | Kadous |
| 7,697,523 B2 | 4/2010 | Leung et al. |
| 7,742,444 B2 | 6/2010 | Mese et al. |
| 7,751,367 B2 | 7/2010 | Gaal et al. |
| 7,768,960 B1 | 8/2010 | Barratt |
| 7,782,807 B2 | 8/2010 | Yoon et al. |
| 7,782,831 B1 | 8/2010 | Feeney |
| 7,818,013 B2 | 10/2010 | Li et al. |
| 7,852,793 B2 | 12/2010 | Prakash |
| 7,855,976 B2 | 12/2010 | Sampath |
| 7,881,245 B2 | 2/2011 | Vijayan et al. |
| 7,924,800 B2 | 4/2011 | Sampath |
| 7,933,219 B2 | 4/2011 | Naguib |
| 7,957,483 B2 | 6/2011 | Yu et al. |
| 7,986,742 B2 | 7/2011 | Ketchum et al. |
| 7,987,505 B2 | 7/2011 | Vadlapudi et al. |
| 8,000,257 B2 | 8/2011 | An et al. |
| 8,000,407 B2 | 8/2011 | Prakash |
| 8,014,749 B2 | 9/2011 | Prakash |
| 8,027,302 B2 | 9/2011 | Prakash et al. |
| 8,032,145 B2 | 10/2011 | Ji |
| 8,036,669 B2 | 10/2011 | Dong et al. |
| 8,078,135 B2 | 12/2011 | Prakash et al. |
| 8,089,888 B2 | 1/2012 | Krishnamurthi et al. |
| 8,089,893 B2 | 1/2012 | Naguib |
| 8,095,141 B2 | 1/2012 | Teague |
| 8,107,421 B2 | 1/2012 | Prakash et al. |
| 8,169,889 B2 | 5/2012 | Walton et al. |
| 8,184,574 B2 | 5/2012 | Sutivong et al. |
| 8,199,661 B2 | 6/2012 | Barriac |
| 8,208,364 B2 | 6/2012 | Walton et al. |
| 8,218,479 B2 | 7/2012 | Barriac |
| 8,238,289 B2 | 8/2012 | Prakash et al. |
| 8,248,950 B2 | 8/2012 | Ulupinar et al. |
| 8,254,924 B2 | 8/2012 | Prakash et al. |
| 8,265,066 B2 | 9/2012 | Prakash et al. |
| 8,265,179 B2 | 9/2012 | Okazaki |
| 8,289,897 B2 | 10/2012 | Ulupinar et al. |
| 8,289,908 B2 | 10/2012 | Barriac |
| 8,326,330 B2 | 12/2012 | Prakash et al. |
| 8,331,285 B2 | 12/2012 | Prakash |
| 8,411,621 B2 | 4/2013 | Barriac |
| 8,457,042 B2 | 6/2013 | Prakash et al. |
| 8,457,092 B2 | 6/2013 | Agrawal et al. |
| 8,477,808 B2 | 7/2013 | Prakash et al. |
| 8,520,628 B2 | 8/2013 | Teague et al. |
| 8,599,712 B2 | 12/2013 | Sampath |
| 2001/0029181 A1 | 10/2001 | Verkama |
| 2001/0034233 A1 | 10/2001 | Tiedemann et al. |
| 2001/0040880 A1 | 11/2001 | Chen et al. |
| 2001/0054959 A1 | 12/2001 | Horn et al. |
| 2002/0003780 A1 | 1/2002 | Braun et al. |
| 2002/0018010 A1 | 2/2002 | Le |
| 2002/0018450 A1 | 2/2002 | McKenna et al. |
| 2002/0022487 A1 | 2/2002 | Ahn |
| 2002/0037716 A1 | 3/2002 | McKenna et al. |
| 2002/0058528 A1 | 5/2002 | Hunzinger |
| 2002/0061749 A1 | 5/2002 | Hunzinger |
| 2002/0077138 A1 | 6/2002 | Bark et al. |
| 2002/0087720 A1 | 7/2002 | Davis et al. |
| 2002/0093920 A1 | 7/2002 | Neufeld et al. |
| 2002/0094827 A1 | 7/2002 | Jou et al. |
| 2002/0101837 A1 | 8/2002 | Bender et al. |
| 2002/0111158 A1 | 8/2002 | Tee |
| 2002/0119787 A1 | 8/2002 | Hunzinger |
| 2002/0123358 A1 | 9/2002 | Butler et al. |
| 2002/0126641 A1 | 9/2002 | Bender |
| 2002/0136286 A1 | 9/2002 | Koo |
| 2002/0137535 A1 | 9/2002 | Hunzinger |
| 2002/0142776 A1 | 10/2002 | Tiedemann, Jr. |
| 2002/0154610 A1 | 10/2002 | Tiedemann, Jr. et al. |
| 2002/0155852 A1 | 10/2002 | Bender |
| 2002/0163894 A1 | 11/2002 | Alapuranen et al. |
| 2002/0168984 A1 | 11/2002 | Wallentin |
| 2002/0181423 A1 | 12/2002 | Chen et al. |
| 2002/0181509 A1 | 12/2002 | Mody et al. |
| 2003/0016702 A1 | 1/2003 | Bender et al. |
| 2003/0031140 A1 | 2/2003 | Oprescu-Surcobe et al. |
| 2003/0039267 A1 | 2/2003 | Koo et al. |
| 2003/0058818 A1 | 3/2003 | Wilkes et al. |
| 2003/0063579 A1 | 4/2003 | Lee |
| 2003/0072452 A1 | 4/2003 | Mody |
| 2003/0078010 A1 | 4/2003 | Davis |
| 2003/0081582 A1 | 5/2003 | Jain et al. |
| 2003/0086366 A1 | 5/2003 | Branlund et al. |
| 2003/0086385 A1 | 5/2003 | Kwon et al. |
| 2003/0112829 A1 | 6/2003 | Sridhar |
| 2003/0115369 A1 | 6/2003 | Walter et al. |
| 2003/0123383 A1 | 7/2003 | Korobkov et al. |
| 2003/0125040 A1 | 7/2003 | Walton et al. |
| 2003/0133494 A1 | 7/2003 | Bender et al. |
| 2003/0144000 A1 | 7/2003 | Glazko et al. |
| 2003/0152049 A1 | 8/2003 | Turner |
| 2003/0179727 A1 | 9/2003 | Soong et al. |
| 2003/0189932 A1 | 10/2003 | Ishikawa et al. |
| 2003/0207692 A1 | 11/2003 | Goldberg |
| 2003/0218973 A1 | 11/2003 | Oprea et al. |
| 2003/0232621 A1 | 12/2003 | Brooks |
| 2004/0002340 A1 | 1/2004 | Lim et al. |
| 2004/0038681 A1 | 2/2004 | Chun |
| 2004/0077370 A1 | 4/2004 | Dick et al. |
| 2004/0081131 A1 | 4/2004 | Walton et al. |
| 2004/0082356 A1 | 4/2004 | Walton et al. |
| 2004/0121771 A1 | 6/2004 | Song et al. |
| 2004/0121774 A1 | 6/2004 | Rajkotia et al. |
| 2004/0127244 A1 | 7/2004 | Matsumoto et al. |
| 2004/0143791 A1 | 7/2004 | Ito et al. |
| 2004/0146030 A1 | 7/2004 | Hsieh et al. |
| 2004/0151231 A1 | 8/2004 | Li et al. |
| 2004/0151264 A1 | 8/2004 | Montojo et al. |
| 2004/0152481 A1 | 8/2004 | Georgeaux et al. |
| 2004/0160922 A1 | 8/2004 | Nanda et al. |
| 2004/0174928 A1 | 9/2004 | Siwiak et al. |
| 2004/0180661 A1 | 9/2004 | Chen et al. |
| 2004/0185879 A1 | 9/2004 | Kong et al. |
| 2004/0193971 A1 | 9/2004 | Soong et al. |
| 2004/0203855 A1 | 10/2004 | Veerasamy et al. |
| 2004/0213214 A1 | 10/2004 | Jung et al. |
| 2004/0221218 A1 | 11/2004 | Grob et al. |
| 2004/0229605 A1 | 11/2004 | Hwang et al. |
| 2004/0252659 A1 | 12/2004 | Yun et al. |
| 2004/0258096 A1 | 12/2004 | Yoon et al. |
| 2004/0259528 A1 | 12/2004 | Gandhi et al. |
| 2004/0264548 A1 | 12/2004 | Miyoshi |
| 2005/0002370 A1 | 1/2005 | An et al. |
| 2005/0030911 A1 | 2/2005 | Tiedemann et al. |
| 2005/0031047 A1 | 2/2005 | Maltsev et al. |
| 2005/0036441 A1 | 2/2005 | Laroia et al. |
| 2005/0047361 A1 | 3/2005 | Fudim et al. |
| 2005/0049013 A1 | 3/2005 | Chang et al. |
| 2005/0054389 A1 | 3/2005 | Lee et al. |
| 2005/0058089 A1 | 3/2005 | Vijayan et al. |
| 2005/0063298 A1 | 3/2005 | Ling et al. |
| 2005/0063339 A1 | 3/2005 | Jeong et al. |
| 2005/0078641 A1 | 4/2005 | Kim |
| 2005/0094576 A1 | 5/2005 | Fonseca et al. |
| 2005/0111397 A1 | 5/2005 | Attar et al. |
| 2005/0111406 A1 | 5/2005 | Pasanen et al. |
| 2005/0113023 A1 | 5/2005 | Bassompiere et al. |

(56) References Cited

U.S. PATENT DOCUMENTS

| | | | |
|---|---|---|---|
| 2005/0117537 A1 | 6/2005 | Okabe |
| 2005/0118981 A1 | 6/2005 | Laroia et al. |
| 2005/0124358 A1 | 6/2005 | Willey |
| 2005/0124362 A1 | 6/2005 | Pecen et al. |
| 2005/0128964 A1 | 6/2005 | Tiedemann et al. |
| 2005/0128993 A1 | 6/2005 | Yu et al. |
| 2005/0135282 A1 | 6/2005 | Miyoshi et al. |
| 2005/0135308 A1 | 6/2005 | Vijayan et al. |
| 2005/0135403 A1 | 6/2005 | Ketchum et al. |
| 2005/0152328 A1 | 7/2005 | Sadri et al. |
| 2005/0157802 A1 | 7/2005 | Park et al. |
| 2005/0163258 A1 | 7/2005 | Gore et al. |
| 2005/0164709 A1 | 7/2005 | Balasubramanian et al. |
| 2005/0165949 A1 | 7/2005 | Teague |
| 2005/0180312 A1 | 8/2005 | Walton et al. |
| 2005/0180362 A1 | 8/2005 | Chin et al. |
| 2005/0182779 A1 | 8/2005 | Perry et al. |
| 2005/0190724 A1 | 9/2005 | Hansen et al. |
| 2005/0201309 A1 | 9/2005 | Kang et al. |
| 2005/0221833 A1 | 10/2005 | Granzow et al. |
| 2005/0232181 A1 | 10/2005 | Park et al. |
| 2005/0233729 A1 | 10/2005 | Stojanovski et al. |
| 2005/0249181 A1 | 11/2005 | Vijayan et al. |
| 2005/0249187 A1 | 11/2005 | Cho et al. |
| 2005/0265346 A1 | 12/2005 | Ho et al. |
| 2005/0266846 A1 | 12/2005 | Kim et al. |
| 2005/0271027 A1 | 12/2005 | Kim et al. |
| 2005/0281226 A1 | 12/2005 | Lee et al. |
| 2005/0281269 A1 | 12/2005 | Choi |
| 2006/0014542 A1 | 1/2006 | Khandekar et al. |
| 2006/0018249 A1 | 1/2006 | Shearer et al. |
| 2006/0019677 A1 | 1/2006 | Teague et al. |
| 2006/0019694 A1 | 1/2006 | Sutivong et al. |
| 2006/0034208 A1 | 2/2006 | Blouin |
| 2006/0034244 A1 | 2/2006 | Huang et al. |
| 2006/0039273 A1 | 2/2006 | Gore et al. |
| 2006/0046762 A1 | 3/2006 | Yoon et al. |
| 2006/0050637 A1 | 3/2006 | Wigard et al. |
| 2006/0062183 A1 | 3/2006 | Forte et al. |
| 2006/0072508 A1* | 4/2006 | Zou et al. ............... 370/332 |
| 2006/0084432 A1 | 4/2006 | Balasubramanian et al. |
| 2006/0098599 A1 | 5/2006 | Choi et al. |
| 2006/0099972 A1 | 5/2006 | Nair et al. |
| 2006/0129816 A1 | 6/2006 | Hinton |
| 2006/0133409 A1 | 6/2006 | Prakash et al. |
| 2006/0135169 A1* | 6/2006 | Sampath et al. ............ 455/447 |
| 2006/0146757 A1 | 7/2006 | Harris |
| 2006/0148493 A1 | 7/2006 | Narasimha et al. |
| 2006/0156365 A1 | 7/2006 | Zhang et al. |
| 2006/0183483 A1 | 8/2006 | Hidaka |
| 2006/0187877 A1 | 8/2006 | Lundby et al. |
| 2006/0193287 A1 | 8/2006 | Ooshima et al. |
| 2006/0194581 A1 | 8/2006 | Kang et al. |
| 2006/0205413 A1 | 9/2006 | Teague |
| 2006/0221883 A1* | 10/2006 | Damnjanovic et al. ........ 370/315 |
| 2006/0223449 A1 | 10/2006 | Sampath et al. |
| 2006/0227891 A1 | 10/2006 | Niu et al. |
| 2006/0245425 A1 | 11/2006 | Mathis et al. |
| 2006/0268768 A1 | 11/2006 | Harris et al. |
| 2006/0280160 A1 | 12/2006 | Padovani et al. |
| 2006/0285485 A1 | 12/2006 | Agrawal et al. |
| 2006/0285558 A1 | 12/2006 | Dottling et al. |
| 2006/0286974 A1 | 12/2006 | Gore et al. |
| 2006/0291577 A1 | 12/2006 | Boariu |
| 2007/0003113 A1 | 1/2007 | Goldberg et al. |
| 2007/0015523 A1 | 1/2007 | Prakash et al. |
| 2007/0022441 A1 | 1/2007 | Nystrom et al. |
| 2007/0060126 A1 | 3/2007 | Taniguchi et al. |
| 2007/0064588 A1 | 3/2007 | Kisoda et al. |
| 2007/0076682 A1 | 4/2007 | Kim et al. |
| 2007/0087767 A1 | 4/2007 | Pareek et al. |
| 2007/0091817 A1 | 4/2007 | Yoon et al. |
| 2007/0097935 A1 | 5/2007 | Gorokhov et al. |
| 2007/0110000 A1 | 5/2007 | Abedi |
| 2007/0121535 A1 | 5/2007 | Chen et al. |
| 2007/0133476 A1 | 6/2007 | Li et al. |
| 2007/0147226 A1 | 6/2007 | Khandekar et al. |
| 2007/0159957 A1 | 7/2007 | Ljung et al. |
| 2007/0217387 A1 | 9/2007 | Choi et al. |
| 2008/0056183 A1 | 3/2008 | Gorokhov et al. |
| 2008/0056188 A1 | 3/2008 | Lu et al. |
| 2008/0076432 A1 | 3/2008 | Senarath et al. |
| 2008/0117842 A1 | 5/2008 | Rao |
| 2008/0123542 A1 | 5/2008 | Karlsson |
| 2008/0187064 A1 | 8/2008 | Miyoshi |
| 2008/0188214 A1 | 8/2008 | Qi |
| 2008/0259811 A1 | 10/2008 | Cordeiro et al. |
| 2008/0271138 A1 | 10/2008 | Chen et al. |
| 2008/0293421 A1 | 11/2008 | Ulupinar et al. |
| 2008/0310357 A1 | 12/2008 | Ulupinar et al. |
| 2008/0311908 A1 | 12/2008 | Prakash et al. |
| 2009/0034445 A1 | 2/2009 | Prakash et al. |
| 2009/0046640 A1 | 2/2009 | Prakash et al. |
| 2009/0046699 A1 | 2/2009 | Prakash |
| 2009/0067547 A1 | 3/2009 | Ulupinar et al. |
| 2009/0086758 A1 | 4/2009 | Prakash et al. |
| 2009/0097437 A1 | 4/2009 | Sutivong et al. |
| 2009/0098841 A1 | 4/2009 | Prakash et al. |
| 2009/0103507 A1 | 4/2009 | Gu et al. |
| 2009/0129325 A1 | 5/2009 | Prakash et al. |
| 2009/0135768 A1 | 5/2009 | Barriac |
| 2009/0147693 A1 | 6/2009 | Teague et al. |
| 2009/0147712 A1 | 6/2009 | Prakash et al. |
| 2009/0147713 A1 | 6/2009 | Prakash |
| 2009/0147729 A1 | 6/2009 | Ulupinar et al. |
| 2009/0147730 A1 | 6/2009 | Ulupinar et al. |
| 2009/0147739 A1 | 6/2009 | Barriac |
| 2009/0149172 A1 | 6/2009 | Prakash et al. |
| 2009/0156207 A1 | 6/2009 | Prakash |
| 2009/0161775 A1 | 6/2009 | Prakash et al. |
| 2009/0164609 A1 | 6/2009 | Prakash et al. |
| 2009/0164658 A1 | 6/2009 | Prakash |
| 2009/0175217 A1 | 7/2009 | Prakash |
| 2009/0180424 A1 | 7/2009 | Prakash et al. |
| 2009/0201833 A1 | 8/2009 | Khandekar |
| 2009/0207744 A1 | 8/2009 | Ulupinar et al. |
| 2009/0207790 A1 | 8/2009 | Ulupinar et al. |
| 2009/0207830 A1 | 8/2009 | Prakash |
| 2009/0213788 A1 | 8/2009 | Prakash et al. |
| 2009/0213789 A1 | 8/2009 | Khandekar et al. |
| 2009/0213790 A1 | 8/2009 | Barriac |
| 2009/0213791 A1 | 8/2009 | Prakash |
| 2009/0219840 A1 | 9/2009 | Barriac |
| 2009/0219845 A1 | 9/2009 | Prakash |
| 2009/0219857 A1 | 9/2009 | Barriac et al. |
| 2009/0219866 A1 | 9/2009 | Prakash et al. |
| 2009/0219867 A1 | 9/2009 | Barriac |
| 2009/0219887 A1 | 9/2009 | Barriac |
| 2009/0219917 A1 | 9/2009 | Prakash et al. |
| 2009/0220033 A1 | 9/2009 | Palanki et al. |
| 2009/0221305 A1 | 9/2009 | Ulupinar et al. |
| 2009/0222698 A1 | 9/2009 | Prakash et al. |
| 2009/0258648 A1 | 10/2009 | Willey |
| 2009/0303890 A1 | 12/2009 | Prakash |
| 2009/0305664 A1 | 12/2009 | Prakash |
| 2009/0316632 A1 | 12/2009 | Prakash |
| 2010/0002597 A1 | 1/2010 | Sampath et al. |
| 2010/0034101 A1 | 2/2010 | Ayman Naguib |
| 2010/0046423 A1 | 2/2010 | Prakash et al. |
| 2010/0069107 A1 | 3/2010 | Mese et al. |
| 2010/0110976 A1 | 5/2010 | Prakash et al. |
| 2010/0150106 A1 | 6/2010 | Barriac |
| 2010/0215030 A1 | 8/2010 | Agrawal et al. |
| 2010/0232293 A1 | 9/2010 | Sagfors et al. |
| 2011/0173464 A1 | 7/2011 | Prakash et al. |
| 2011/0199996 A1 | 8/2011 | Zhang et al. |
| 2013/0010755 A1 | 1/2013 | Barriac |

FOREIGN PATENT DOCUMENTS

| | | |
|---|---|---|
| CN | 1350730 A | 5/2002 |
| CN | 1496636 A | 5/2004 |
| CN | 1666448 A | 9/2005 |
| EP | 0475698 A2 | 3/1992 |

(56) References Cited

FOREIGN PATENT DOCUMENTS

| | | |
|---|---|---|
| EP | 0687078 A2 | 12/1995 |
| EP | 0869647 A2 | 10/1998 |
| EP | 0955736 A2 | 11/1999 |
| EP | 1052866 | 11/2000 |
| EP | 1124347 A2 | 8/2001 |
| EP | 1158685 A1 | 11/2001 |
| EP | 1202591 A2 | 5/2002 |
| EP | 1223775 | 7/2002 |
| EP | 1315310 A2 | 5/2003 |
| EP | 1388964 A1 | 2/2004 |
| EP | 1458209 A2 | 9/2004 |
| EP | 1471760 A2 | 10/2004 |
| EP | 1487230 A1 | 12/2004 |
| EP | 1496632 A1 | 1/2005 |
| EP | 1513282 A2 | 3/2005 |
| EP | 1534039 | 5/2005 |
| EP | 1004217 | 6/2005 |
| EP | 1583309 A2 | 10/2005 |
| EP | 1587233 | 10/2005 |
| EP | 1678906 A1 | 7/2006 |
| EP | 1714416 | 10/2006 |
| EP | 1949730 | 7/2008 |
| JP | 0722998 | 1/1995 |
| JP | 7504552 T | 5/1995 |
| JP | 7226724 A2 | 8/1995 |
| JP | 8172671 | 7/1996 |
| JP | 8242218 A | 9/1996 |
| JP | 9509547 | 9/1997 |
| JP | 10155179 A | 6/1998 |
| JP | 10242903 A | 9/1998 |
| JP | 11313370 A | 11/1999 |
| JP | 2000506343 A | 5/2000 |
| JP | 2000232688 A | 8/2000 |
| JP | 2001512638 T | 8/2001 |
| JP | 2001514813 A | 9/2001 |
| JP | 2001274767 | 10/2001 |
| JP | 2002010341 A | 1/2002 |
| JP | 2002026795 A | 1/2002 |
| JP | 2002152129 A | 5/2002 |
| JP | 2002158609 A | 5/2002 |
| JP | 2002300628 | 10/2002 |
| JP | 2002305534 A | 10/2002 |
| JP | 2002539707 | 11/2002 |
| JP | 2002540692 | 11/2002 |
| JP | 2003500891 T | 1/2003 |
| JP | 2003511962 T | 3/2003 |
| JP | 2003110582 A | 4/2003 |
| JP | 2003517741 T | 5/2003 |
| JP | 2003524328 | 8/2003 |
| JP | 2003525555 | 8/2003 |
| JP | 2003309533 | 10/2003 |
| JP | 2004088180 A | 3/2004 |
| JP | 2004153619 A | 5/2004 |
| JP | 2004159235 | 6/2004 |
| JP | 2004517534 T | 6/2004 |
| JP | 2004247801 A | 9/2004 |
| JP | 2004247985 A | 9/2004 |
| JP | 2004530347 | 9/2004 |
| JP | 2004531124 | 10/2004 |
| JP | 2004532542 A | 10/2004 |
| JP | 2004328772 | 11/2004 |
| JP | 2005012806 A | 1/2005 |
| JP | 2005502218 A | 1/2005 |
| JP | 2005080312 A | 3/2005 |
| JP | 2005508588 | 3/2005 |
| JP | 2005101990 A | 4/2005 |
| JP | 2005514865 T | 5/2005 |
| JP | 2005149303 A | 6/2005 |
| JP | 2005160079 A | 6/2005 |
| JP | 2005233621 A | 9/2005 |
| JP | 2005286998 A | 10/2005 |
| JP | 2006511132 A | 3/2006 |
| JP | 2006523392 A | 10/2006 |
| JP | 2007501580 T | 1/2007 |
| JP | 4746096 | 5/2011 |
| KR | 20010016706 | 3/2001 |
| KR | 1020010082061 | 8/2001 |
| KR | 1020030007481 | 1/2003 |
| KR | 20040007214 | 1/2004 |
| KR | 20040050145 | 6/2004 |
| KR | 20050053787 | 6/2005 |
| KR | 20060014618 A | 2/2006 |
| RU | 2073913 | 2/1997 |
| RU | 2198465 C2 | 2/2003 |
| TW | 478269 | 3/2002 |
| TW | 531982 | 5/2003 |
| TW | 200302642 | 8/2003 |
| TW | 1223532 | 11/2004 |
| TW | 1223944 | 11/2004 |
| TW | 200501641 | 1/2005 |
| TW | 1239782 | 9/2005 |
| TW | 1240524 | 9/2005 |
| WO | 9318601 | 9/1993 |
| WO | 9730531 A1 | 8/1997 |
| WO | 9733399 | 9/1997 |
| WO | 9835520 | 8/1998 |
| WO | 9839938 | 9/1998 |
| WO | 9848581 A1 | 10/1998 |
| WO | 9854919 | 12/1998 |
| WO | 9943101 | 8/1999 |
| WO | 0007260 A2 | 2/2000 |
| WO | 0010353 A1 | 2/2000 |
| WO | 0013451 | 3/2000 |
| WO | 0014900 A1 | 3/2000 |
| WO | 0018173 | 3/2000 |
| WO | 0035107 | 6/2000 |
| WO | 0055976 A2 | 9/2000 |
| WO | 0057662 | 9/2000 |
| WO | 0057663 | 9/2000 |
| WO | 0113669 A1 | 2/2001 |
| WO | 0117288 A1 | 3/2001 |
| WO | 0120808 A2 | 3/2001 |
| WO | 0131887 A1 | 5/2001 |
| WO | 0160104 A1 | 8/2001 |
| WO | 0176110 A2 | 10/2001 |
| WO | 0176279 | 10/2001 |
| WO | 0182504 | 11/2001 |
| WO | 0197538 | 12/2001 |
| WO | 0228120 A2 | 4/2002 |
| WO | 0243412 | 5/2002 |
| WO | 0247321 | 6/2002 |
| WO | 0249305 A2 | 6/2002 |
| WO | 02073867 | 9/2002 |
| WO | 02080600 A1 | 10/2002 |
| WO | 02093839 | 11/2002 |
| WO | 03015435 | 2/2003 |
| WO | 03043251 | 5/2003 |
| WO | 03051076 | 6/2003 |
| WO | 03069933 | 8/2003 |
| WO | 2004004173 | 1/2004 |
| WO | 2004032548 A1 | 4/2004 |
| WO | 2004032559 | 4/2004 |
| WO | 2004038984 A2 | 5/2004 |
| WO | 2004038988 A2 | 5/2004 |
| WO | 2004039027 | 5/2004 |
| WO | 2004054206 A1 | 6/2004 |
| WO | 2004057897 A1 | 7/2004 |
| WO | 2004073200 | 8/2004 |
| WO | 2004077752 | 9/2004 |
| WO | 2004077778 A1 | 9/2004 |
| WO | 2004079949 A1 | 9/2004 |
| WO | 2004082181 A1 | 9/2004 |
| WO | 2004086711 | 10/2004 |
| WO | 2004091231 A1 | 10/2004 |
| WO | 2004100450 A1 | 11/2004 |
| WO | 2004107796 A1 | 12/2004 |
| WO | 2005004525 | 1/2005 |
| WO | 2005022811 A2 | 3/2005 |
| WO | 2005027355 | 3/2005 |
| WO | 2005034438 A1 | 4/2005 |
| WO | 2005039128 | 4/2005 |
| WO | 2005041515 | 5/2005 |
| WO | 2005048517 A1 | 5/2005 |
| WO | 2005055640 | 6/2005 |

(56) References Cited

FOREIGN PATENT DOCUMENTS

| WO | 2005060277 |    | 6/2005 |
|----|------------|----|--------|
| WO | 2005064875 |    | 7/2005 |
| WO | 2005067173 | A1 | 7/2005 |
| WO | 2005067181 | A1 | 7/2005 |
| WO | 2005071989 |    | 8/2005 |
| WO | 2005074184 | A2 | 8/2005 |
| WO | 2005079081 | A1 | 8/2005 |
| WO | 2005081444 | A1 | 9/2005 |
| WO | 2005088863 |    | 9/2005 |
| WO | 2005096560 | A1 | 10/2005 |
| WO | 2006007318 | A1 | 1/2006 |
| WO | 2006023705 |    | 3/2006 |
| WO | 2006069176 | A2 | 6/2006 |
| WO | 2006069320 |    | 6/2006 |
| WO | 2006099062 | A1 | 9/2006 |
| WO | 2006109492 |    | 10/2006 |
| WO | 2006138556 |    | 12/2006 |
| WO | 2006138573 | A2 | 12/2006 |
| WO | 2007050876 |    | 5/2007 |
| WO | 2007050939 |    | 5/2007 |

OTHER PUBLICATIONS

3GPP C.S0024-A: CDMA2000 High Rate Packet Data Air Interface Specification 3Rrd Generation Partnership Project 2, 3GPP2, Jul. 2005, pp. 8-76-8-162, XP002428084.

3GPP, ETSI: Universal Mobile Telecommunications system (UMTS); Radio Resource Control (RRC); Protocol specification (3GPP TS 25.331 version 7.2.0 Release 7). ETSI TS 125 331 V.7.2.0, Sep. 2006, XP002423759.

3GPP2—3rd Generation Partnership Project 2. "cdma2000 High Rate Packet Air Interface Specification" 3GPP2 C. S0024-A Version 2.0, Jul. 2005, XP002428850. Published online at [http://www.3gpp2.org/Public_html/specs/C . S0024-A_v2.0_050727.pdf], retrieved on May 19, 2009. 1227 pages.

3GPP2: "cdma 2000 High Rate Packet Data Air Interface Specification", 3rd Generation Partnership Project 2,3GPP2 C.S0024-A Version 2.0, pp. 8-25-8-28.

3GPP2 "cdma2000 High Rate Packet Data Air interface Specification",3rd Generation Partnership Project 2 C.S0024, Sep. 12, 2000, pp. 1-417.

3GPP2 C: "cdma2000 High Rate Packet Data 1-9, Air Interface Specification; 3GPP2, C.SO024-A version 2.0," 3GPP2 CDMA2000, Jul. 2005, XP002425687.

3GPP2 C: "cdma2000 High Rate Packet Data Air Interface Specification; 3GPP2 C S0024-A version 2.0," 3GPP2 CDMA2000, Jul. 2005, 43 pages, XP002422601.

3GPP2 C: "cdma2000 High Rate Packet Data Air Interface Specification; 3GPP2 C.S0024-A version 2.0," 3GPP2 CDMA2000, Jul. 2005, p. 0, 8-13-8-15, 8-101, XP002426056, p. 8-13, line 17-line 35; p. 8-14, line 15-line 32; p. 8-15, line 4-line 12; p. 8-101, line 30-line 32.

3GPP2 C: "cdma2000 High Rate Packet Data Air Interface Specification; 3GPP2 C.SO024-A version 2.0," 3GPP2 CDMA2000, Jul. 2005, p. 0, 5-28-5-30,8-101-8-103,9-106, XP002426414.

3GPP2 C: "cdma2000 High Rate Packet Data Air Interface Specification; 3GPP2 C.SO024-A version 2.0," 3GPP2 CDMA2000, Jul. 2005, p. 0, 8-11-8-12,8-29-8-32,846-8-87, 8-101, XP002426182.

3GPP2 C: "cdma2000 High Rate Packet Data Air Interference Specification; 3GPP2C.SO024-A version 2.0" 3GPP2 CDMA2000 Jul. 2005, XP002425754.

3GPP2 C: "cdma2000 High Rate Packet Data Air Interface Specification; 3GPP2 C.SO024-A version 1.0," 3GPP2,Mar. 2004, p. 0,9-85, XP002427173.

3GPP2 C: cdma2000 High Rate Packet Data Air Interface Specification; 3GPP2 C.SO024-A version 2.0, CDMA2000, Jul. 2005 , p. 0, 8-98,8-106, 8-120-8-121, XP002427172.

3GPP2 C: "cdma2000 High Rate Packet Data Air Interface Specification",3GPP2 C. S0024-A version 2.0, 3GPP2 CDMA2000, May 2006,1621 pages.

3GPP2 C. 50024-A:"cdma2000 High Rate Packet Data Air Interface Specification", Version 2.0, 3rd Generation Partnership Project 2 3GPP2, [Online] Jul. 2005, pp. 8-78-8-84, XP002425979 Retrieved from the Internet : URL: http ://www .3gpp2.org/Public_html / specs />.

3GPP2: "cdma 2000 High Rate Packet Data Air Interface Specification", 3GPP2 C.S0024-A, Jul. 2005, Version 2.0, p. 8-26, 8-38.

3GPP2: "cdma 2000 High Rate Packet Data Air Interface Specification", 3GPP2 C.S0024-A, Sep. 2000, Version 2.0, P. 6-7-6-8.

3GPP2: "cdma2000 High Rate Packet Data Air Interface Specification", 3GPP2 C.S0024-A, Jul. 2005, Version 2.0, P. 8-151,8-157-8-169, section 8.9.1 and 8.9.6.2.1, URL, http://www.3gpp2.org/Public_html/specs/C.S0024-A_v2.0_050727.pdf.

3GPP2: "cdma2000 High rate packet data air interface specification" 3GPP2 C.SO024, [Online] Oct. 27, 2000, pp. 6-29-6-31, XP002423350 Retrieved from the Internet: URL: http ://www. 3gpp2. org/public-html/specs /C.S0024_v2.0. pdf.

3GPP2: "CDMA2000 high rate packet data air interface specification" 3GPP2 C.SO024-A, Jun. 2006, p. 10-30-1 0-80, XP002424373. http://www.3gpp2.org/Public-html/specs/C.S0024-Av2.0050727.pdf. Last accessed on Mar. 12, 2007.

3GPP2: "CDMA2000 High Rate Packet Data Air Interface Specification; 3GPP2 C.SO024-A, Version 2.0" 3rd Generation Partnership Project 2 3GPP2, XX, XX, Jul. 2005, pp. 8-154-8-165, XP002424136.

3GPP2: "CDMA2000 High Rate Packet Data Air Interface Specification; 3GPP2 C.SO024-A, Version 2.0" 3rd Generation Partnership Project 2 3GPP2, XX, XX, Jul. 2005, pp. 8-170, XP002436091 p. 8-152.

3GPP2. "cdma2000 High Rate Packet Data Air Interface Specification", Chapter 9—"Connection Layer", C.S0024-A, Version 1.0, Mar. 2004, 144 pages, XP002424014.

3GPP2: "CDMA2000 High Rate Packet Data Air Interface Specification; 2GPP2 C.SO024-A, Version 2.0, pp. 1-4-1-5 and 8-71-8-80" 3GPP2, Jul. 2005, XP002429844.

3GPP2, "cdma2000 High Rate Packet Data Air Interface Specification", C. S0024-A Version 2.0, Oct. 27, 2000, 441 pages.

3GPP2, "cdma2000 High Rate Packet Data Air Interface Specification", C.SO024-A Version 2.0, Jul. 2005, 24 pages.XP002429569.

3GPP2: "cdma2000 High Rate Packet Date Air Interface Specification", Version 2.0, 3GPP2 C.S0024-A, 8-68-8-69, Jul. 2005.

3GPP2: "coma 2000 High Rate Packet Data Air Interface Specification" 3GPP2 C. S0024, version 2.0, pp. 8-21-8-28, XP002423051, section 8.3.6.1.3. http://www.3gpp2.org/public_html/specs/C.S0024_v2.0.pdf . Last accessed May 23, 2008, 441 pages.

3GPP2 C.S0024: "cdma2000 High Rate Packet Data Air Interface Specification" 3GPP Standards, Sep. 12, 2000, XP002206456.

3GPP2 C.S0024-0-Version 4.0 "cdma2000 High Rate Packet Data Air Interface Specification" , p. 1-548, Oct. 25, 2002.

3GPP2 C.S0024-A, "cdma 2000 High Rate Packet Data Air Interface Specification", Version 2.0, 7-18, 8-29, 8-36, 8-38-8-39, 8-41,8-155-8-156, 10-1, Jul. 2005.

3GPP2 C.S0024-A, "CDMA 2000 High Rate Packet Data Air Interface Specification", Version 2.0, 8-15, 8-43, Jul. 2005.

3GPP2 C.S0024-A, "CDMA 2000 High Rate Packet Data Air Interface Specification", Version 2.0, 8-151-8-155, Jul. 2005.

3GPP2: "C.s0024-A: cdma2000 High Rate Packet Data Air Interface Specification" Jul. 2005, pp. 1, 8/29-8/40, XP002423333. http://www.3gpp2.org/Public_htrnl/specs/C.S0024-A_v2.0_050727.pdf . Last accessed Jul. 18, 2008, 13 pages.

3GPP2 C.S0024-A V2.0, Jul. 2005, p. 8-11-8-12, 8-29-8-31, (for information: p. 8-86-8-87, 8-101).

3GPP2 C.S0024-A V2.0, Jul. 2005, pp. 8-10 to 8-12, 8-29 to 8-32, 8-86 to 8-87, 8-106, and 8-168.

3GPP2 C.S0024-A, Version 2.0—3rd Generation Partnership Project 2; "CDMA2000 High Rate Packet Data Air Interface Specification"; Jul. 2005, 1227 pages; XP002431799.

3GPP2 C.S0038-A: "Signaling Conformance Specification for High Rate Packet Data Air Interface"; Sep. 26, 2005.

3GPP2: "C.SO024-A: CDMA2000 High Rate Packet Data Air Interface Specification". 3rd Generation Partnership Project, Jul. 2005, pp. 1, 8/54-8/56-8/68, XP002423049.

(56) References Cited

OTHER PUBLICATIONS

3GPP2. Medium Access Control (MAC) Standard for cdma2000 Spread Spectrum Systems, 3GPP2 C.S0003-D Version 1.0, p. '2-87'-'2.92, Feb. 13, 2004, published online at [http://www.3gpp2.org/Public_html/specs/C.S0003-D.v1.0_MAC_031504.pdf] 8 pages.
3GPP2, Medium Access Control (MAC) Standard for cdma2000 Spread Spectrum Systems, Release D , C.SO003-D Version 2.0, Sep. 2005, 4 pages. XP002429570.
3GPP2:"cdma 2000 High Rate Packet Data Air Interface Specification" 3GPP2 C. S0024, version 2.0, Jul. 2005, p. 0, 8-151 para8.9, 8-154para8.9.6.1, 8-155para8.9.6.1.2, 8.9.6.1.2.1, 8.9.6.1.2.2,XP002424076, http://www.3gpp2.org/public~html/specs/C.S0024_v20pdf Last accessed May 23, 2008, 441 pages.
3GPP2:"cdma 2000 High Rate Packet Data Air Interface Specification" 3GPP2 C. S0024, version 2.0, pp. 482-532, 1179, XP002423741, paragraphs 8.7.6.1.6.6-8.7.6.1.6.7, para 8.7.6.2.3. http://www.3gpp2.org/public_html/specs/C.S0024 v 2.0pdf Last accessed May 23, 2008, 441 pages.
3rd Generation Partnership Project 2 "3GPP2" : "CDMA2000 High Rate Packet Data Air Interface Specification". 3GPP2 C.SO024-A Version 2.0, Jul. 2005, pp. 7-18, XP002423355.
3rd Generation Partnership Project 2 "3GPP2" : "CDMA2000 High Rate Packet Data Air Interface Specification".3GPP2 C.SO024-A Version 2.0, Jul. 2005, pp. 1-1-1-12, XP002423354.
3rd Generation Partnership Project 2 "3GPP2" : "CDMA2000 High Rate Packet Data Air Interface Specification".3GPP2 C.SO024-A Version 2.0, Jul. 2005, pp. 8-81-8-106, XP002423353.
3rd Generation Partnership Project 2 "3gPP2": "cdma200 High Rate Packet Data Air Interface Specification" 3GPP2 C.S0024-A, Version 2.0, Jul. 2005, XP002426687.
3rd Generation Partnership Project 2 "3GPP2" "cdma200 High Rate Packet Data Air Interface Specification" 3GPP2 C.S0024-A Version 2.0, Jul. 2005, XP002427508.
3rd Generation Partnership Project 2 3GPP2: "cdma2000 High Rate Packet Data Air Interface Specification".
3rd Generation Partnership Project 2 3GPP2: "cdma2000 High Rate Packet Data Air Interface Specification ; 3GPP2 C .S0024-A Version 2.0"[Online] Jul. 2005, pp. 8-5-8-20, XP002423185.
3rd Generation Partnership Project 2 "3GPP2": "cdma2000 High Rate Packet Data Air Interface Specification" 3GPP2 CS0024-A Version 20, Jul. 2005, XP002429115.
3rd Generation Partnership Project 2 "3GPP2": "cdma2000 High Rate Packet Data Air Interface Specification" 3GPP2 C.S0024-A Version 2.0, Jul. 2005, XP002430079.
3rd Generation Partnership Project 2 3GPP2: "cdma2000 High Rate Packet Data Air Interface Specification" 3GPP2 C.S0024-A Version 2.0, Jul. 2005, XP002428039.
3rd Generation Partnership Project 2 "3GPP2", cdma2000 High Rate Packet Data Air Interface Specification (Jul. 2005).
3rd Generation Partnership Project 2 "3GPP2". CDMA2000 High Rate Packet Data Air Interface Specification. 3GPP2 C.SO024-A, Version 2.0 Jul. 2005, pp. 3-5 to 3-11, XP02424183 www.3gpp2.orglpublic~html/specs/tsgc.cfmL. ast accessed Mar. 5, 2007.
3rd Generation Partnership Project 2 "3GPP2": "CDMA2000 High Rate Packet Data Air Interface Specification; 3GPPS C.S0024-A Version 2.0".Jul. 2005,pp. 8-29-8- 45,XP002423079.http://www.3gpp2.wrg/public_html/specs/tsgc.cfm.
3rd Generation Partnership Project 2 "3GPP2": "Signaling Link Access Control (LAC) Standard for cdma200 Spread Spectrum Systems Revision D v2.0" 3GPP2 C.S0004-D Version 2.0, Sep. 2005, XP002427509, pp. 1-12, pp. 2-46-pp. 2-51.
3rd Generation Partnership Project 2 "3GPP2": Medium Access Control (MAC) Standard for cdma2000 Spread Spectrum Systems, Release; 3GPP2 C.S0003-D Version 2.0, Sep. 2005, pp. 1-230, XP002429116.
802.20 Evaluation Criteria—Ver. 1.0, IEEE 802 Laniman Standards Committee, Sep. 23, 2005, pp. 18-35,URL: [http://www.ieee802.org/20/P_Docs/IEEE_802.20-PD-09.doc].
Agilent Technologies: Performing Base Station Over—Air Maintenance with the Agilent E6474A CDMA , Mar. 2002, XP002423351, retrieved from the internet on Mar. 6, 2007, pp. 16-17, 23. http://cp.literature.agilent.com/litweb/pdf/E6474-90042.pdf. Last accessed May 23, 2008, 33 pages.
cdma2000 High Rate Packet Data Air Interface Specification, 3GPP2 C.S0024-A Version 2.0, Jul. 2005, p. 8-97-8-114, URL , http : //www.3gpp2 .org/Public_html/specs/C.S0024-Av2.0_050727.pdf.
Co-Pending U.S. Appl. No. 07/847,152, filed Mar. 5, 1992.
Co-pending U.S. Appl. No. 09/359,855, filed Jul. 22, 1999.
Co-pending U.S. Appl. No. 09/539,497, filed Mar. 30, 2000.
Damnjanovic, A.D. et al., "IS-2000 Enhanced Closed Loop Power Control for Turbo Coding," IEEE 54th Vehicular Technology Proceedings, Oct. 7-11, 2001, pp. 2314-2318, XP-010562383.
ETS 300744, Digital Video Broadcasting; Framing Structure, Channel Coding, and Modulation for digital Terrestrial Television, European Telecommunication Standards Institute (ETSI), Nov. 1996.
European Search Report—EP10161074, Search Authority—Munich Patent Office, Oct. 6, 2010.
European Search Report—EP13151940—Search Authority—Munich—Apr. 9, 2013.
European Search Report dated Jun. 16, 2011 for EP Application Serial No. 11167329.9, 6 pages.
European Search Report mailed Nov. 29, 2010 for European Application No. 10152463.5-2413, 6 pages.
Harada et al., "Investigations on BLER requirements of associated control channels for IP packet transmission in forward link for VSF-OFCDM broadband packet wireless access", Vehicular Technology Conference, 2004. VTC2004-Fall. 2004 IEEE 60th, Sep. 2004.
IEEE 802.20 Working Group on Mobile Broadband Wireless Access; QFDD and QTDD: Proposed Draft Air Interface Specification; IEEE C802.20-05/69, Oct. 28, 2005, retrieved from the internet on Mar. 5, 2007, pp. 6-43-6-44, XP002425098, http://ieee802.org/20/Contributions.html. Last accessed May 24, 2008, 624 pages.
IEEE: "Draft IEEE Standard for Local and metropolitan area networks, Part 16: Air Interface for Fixed Broadband WirelessAccess-Systems,chapters:6.3.2.3,6.3.15-6.3.17,8.2.1.4-8.2.1.11,8.3.5-8.4.5,8.4.11,11". IEEEP802.16-REVDID5, May 2004, XP002423445.
IEEE Standard 802.16, IEEE Standard for Local and Metropolitan Area Networks, Part 16: Air Interface for Fixed Broadband Wireless Access Systems, pp. 1-895, Oct. 1, 2004.
International Preliminary Report on Patentability—PCT/US06/009549, The International Bureau of WIPO—Geneva, Switzerland—Sep. 18, 2007.
International Preliminary Report on Patentability—PCT/US06/023587—Dec. 17, 2007.
International Preliminary Report on Patentability—PCT/US2006/023483, International Bureau of WIPO—Geneva Switzerland—Dec. 17, 2007.
International Search Report—PCT/US2006/009549, International Search Authority—European Patent Office—Jun. 20, 2006.
International Search Report & Written Opinion mailed Apr. 16, 2007 for PCT Application No. PCT/US2006/042260, 13 pages.
International Search Report & Written Opinion mailed Apr. 23, 2007 for PCT Application No. PCT/US2006/042083, 17 pages.
International Search Report & Written Opinion mailed Apr. 25, 2007 for PCT Application No. PCT/US06/042025, 15 pages.
International Search Report & Written Opinion mailed May 3, 2007 for PCT Application No. PCT/US06/041943, 13 pages.
International Search Report and Written Opinion—PCT/US2006/023483, International Search Authority—European Patent Office, Dec. 19, 2006.
International Search Report and Written Opinion—PCT/US2006/041869, International Search Authority—European Patent Office—Mar. 6, 2007.
International Search Report and Written Opinion—PCT/US2006/041931, International Search Authority—European Patent Office—Feb. 16, 2007.
International Search Report and Written Opinion—PCT/US2006/041982, International Search Authority—European Patent Office—May 24, 2007.
International Search Report and Written Opinion—PCT/US2006/042055, International Search Authority—European Patent Office—May 31, 2007.

(56) References Cited

OTHER PUBLICATIONS

International Search Report and Written Opinion—PCT/US2006/042226, International Search Authority—European Patent Office—Feb. 26, 2007.
International Search Report and Written Opinion—PCT/US2006/042493, International Search Authority—European Patent Office—Mar. 12, 2007.
International Search Report and Written Opinion—PCT/US2006/060337, International Search Authority—European Patent Office—Mar. 29, 2007.
International Search Report and Written Opinion—PCT/US2006/041776, International Search Authority—European Patent Office—May 22, 2007.
International Search Report and Written Opinion—PCT/US2006/041929, International Search Authority—European Patent Office—Apr. 17, 2007.
International Search Report and Written Opinion—PCT/US2006/041937, International Search Authority—European Patent Office—Jun. 20, 2007.
International Search Report and Written Opinion—PCT/US2006/041945, International Search Authority—European Patent Office—Mar. 21, 2007.
International Search Report and Written Opinion—PCT/US2006/041998, International Search Authority—European Patent Office—Apr. 4, 2007.
International Search Report and Written Opinion—PCT/US2006/042108, International Search Authority—European Patent Office—Feb. 23, 2007.
International Search Report and Written Opinion—PCT/US2006/042113, International Search Authority—European Patent Office—May 3, 2007.
International Search Report and Written Opinion—PCT/US2006/042302, International Search Authority—European Patent Office—Mar. 14, 2007.
International Search Report and Written Opinion—PCT/US2006/042412, International Search Authority—European Patent Office—May 16, 2007.
International Search Report and Written Opinion—PCT/US2006/042419, International Search Authority—European Patent Office—May 7, 2007.
International Search Report and Written Opinion—PCT/US2006/042488 International Search Authority—European Patent Office—Mar. 21, 2007.
International Search Report and Written Opinion—PCT/US2006/042599, International Search Authority—European Patent Office—Mar. 28, 2007.
International Search Report and Written Opinion dated Apr. 27, 2007, for PCT Application Serial No. PCT/US2006/042079, 16 pages.
International Search Report and Written Opinion dated Apr. 13, 2007, for PCT Application Serial No. PCT/US2006/042013, 17 pages.
International Search Report and Written Opinion for PCT Application No. PCT/US 2006/042011, mailed Mar. 19, 2007, 3 pages.
International Search Report and Written Opinion for PCT Application No. PCT/US2006/042084, mailed Mar. 19, 2007, 15 pages.
International Search Report and Written Opinion for PCT Application No. PCT/US2006/042322, mailed Mar. 15, 2007, 14 pages.
International Search Report and Written Opinion for PCT Application No. PCT/US2006/041731, published on May 3, 2007, pp. 34.
International Search Report and Written Opinion for PCT Application No. PCT/US2006/041777, mailed Mar. 19, 2007, 14 pages.
International Search Report and Written Opinion for PCT Application No. PCT/US2006/041785, published on May 4, 2007, pp. 26.
International Search Report and Written Opinion for PCT Application No. PCT/US2006/041910, dated Mar. 21, 2007.
International Search Report and Written Opinion for PCT Application No. PCT/US2006/041919, published on May 3, 2007, pp. 26.
International Search Report and Written Opinion for PCT Application No. PCT/US2006/041963, mailed Mar. 21, 2007, 19 pages.
International Search Report and Written Opinion for PCT Application No. PCT/US2006/042414, mailed on Sep. 3, 2007, 16 pages.
International Search Report and Written Opinion for PCT Application No. PCT/US2007/051037 A2, published on May 3, 2007, pp. 27.
International Search Report and Written Opinion mailed Mar. 14, 2007 for PCT Application No. PCT/US2006/042082, 14 pages.
International Search Report and Written Opinion mailed Apr. 16, 2007 for PCT Application No. PCT/US06/042010, 14 pages.
International Search Report and Written Opinion mailed Apr. 16, 2007 for PCT Application No. PCT/US2006/042311, 15 pages.
International Search Report and Written Opinion mailed Apr. 16, 2007 for PCT Application Serial PCT/US2006/041873, 12 pages.
International Search Report and Written Opinion mailed May 3, 2007 for PCT Application No. PCT/US2006/042112, 15 pages.
International Search Report and Written Opinion mailed Apr. 10, 2007 for PCT Patent Application No. PCT/US2006/042028,16 pages.
International Search Report and Written Opinion PCT/US2006/041971—International Search Authority—European Patent Office—Sep. 7, 2007.
International Search Report and Written Opinion PCT/US2006/042032, International Search Authority—European Patent Office—Mar. 21, 2007.
International Search Report dated Mar. 12, 2007 for PCT Application Serial No. PCT/US2006/041981, 2 Pages.
International Search Report dated Apr. 27, 2007 for PCT Application Serial No. PCT/US2006/042418, 15 pages.
International Search Report dated May 3, 2007 for PCT Application No. PCT/US2006/042325, 3 pages.
International Search Report dated Apr. 3, 2007, mailed Apr. 17, 2007 for PCT/US2006/042067, 4 pages.
International Search Report dated Mar. 12, 2007, mailed Mar. 21, 2007 for PCT/US2006/041946, 6 pages.
International Search Report dated Mar. 29, 2007, mailed Apr. 16, 2007 for PCT/US2006/042313, 12 pages.
International Search Report dated Mar. 6, 2007, mailed Mar. 20, 2007 for PCT/US2006/041961, 4 pages.
International Search Report dated May 8, 2008, for PCT Application Serial No. PCT/US2006/041900, 10 pages.
International Search Report for PCT Application No. PCT /US 2006 /041870, mailed Apr. 16, 2007, 3 pages.
International Search Report for PCT Application No. PCT/US2006/041914, mailed Apr. 20, 2007,5 pages.
International Search Report for PCT Application No. PCT/US2006/041942, mailed Mar. 28, 2007, 4 pages.
International Search Report for PCT Application No. PCT/US2006/042310, mailed Mar. 15, 2007, 3 pages.
International Search Report for PCT Application No. PCT/US2006/041933,Maled Mar. 14, 2007, 2 Pages.
International Search Report for PCT Application Serial No. PCT/US06/042012 dated Apr. 16, 2007, 13 pages.
International Search Report mailed Feb. 28, 2007 for International Patent Application Serial No. PCT/US20061042023, 4 pages.
International Search Report mailed Mar. 6, 2007 for PCT ApplicationNo. PCT/US2006/041908, 2 Pages.
International Search Report PCT Application No. PCT/US2006/041921 dated Mar. 15, 2007, pp. 2.
International Search Report—PCT/US2006/023587—International Search Authority—Jan. 11, 2007.
ISR and Written Opinion mailed Apr. 29, 2008 for PCT Application Serial No. PCT/US2006/042255, 16 pages.
Jeon, et al., An enhanced channel-quality indication (CQI) reporting scheme for HSDPA systems, IEEE Communication letters, May 2005, vol. 9, pp. 432-434.
Jim Tomcik, "C80220-05169: QFDD and QTDD: Proposed Draft Air Interface Specification" IEEE : Contributions to IEEE 80220 session 17: Nov. 14-17, 2005 dated Oct. 28, 2005 XP002422600 http://ieee802org/20/Contributions.html Last accessed Mar. 1, 2007.
Jim Tomcik, "C802.20-05/69: QFDD and QTDD: Proposed Draft Air Interface Specification". Contributions to IEEE 802.20 Session 17:Nov. 14-17, 2005; Oct. 28, 2010; pp. 1-624; XP002423945. http://ieee802.org/20/Contributions.html.

(56) References Cited

OTHER PUBLICATIONS

Jim Tomcik, "C802.20-05/69: QFDD and QTDD: Proposed Draft Air Interface Specification" IEEE 802.20 Contribution to Session #17 (14.1 1-17.11.2005) Oct. 28, 2005, pp. 1-5/43, XP002428557.
Jim Tomcik, "C802.20-05/69:QFDD and QTDD: Proposed Draft Air Interface Specification". Contributions to IEEE 802.20 session 17 dated Oct. 28, 2005, pp. 1, 6/13-6/32, XP002423050.
Jim Tomcik, et al., MBFDD and MBTDD: Proposed Draft Air Interface Specification. IEEE 802.20 Working Group on Mobile Broadband Wireless Access, Jan. 6, 2006; pp. 1-839; XP002426594. http://www.ieee802.org/20/Contribs/C802.20-06-04.pdf.
Jim Tomcik, "MBFDD and MBTDD Wideband Mode: Technology Overview", IEEE C802.20-05/68r1, Jan. 6, 2006.
Jim Tomcik, "QFDD and QTDD: Proposed Draft Air Interface Specification" Oct. 28, 2005 "IEEE 802.20 Working Group on Mobile Broadband Wireless Access" pp. 6-20-6-23 XP002423332.
Jim Tomcik, QFDD and QTDD: Technology Overview, IEEE 802.20 Working Group on Mobile Broadband Wireless Access, Oct. 28, 2005, pp. 48-50, URL, http://www.IEEE802.org/20/contribs/c802.20-05-68.zip.
Korowajczuk L., et al, "Designing cdma2000 Systems", John Wiley & Sons, Inc., 2004, 34 pages.
Liu Dawei, et al., "A New Access Method Used in Beyond 3G Mobile System Using MC-CDMA" in International Conference on Communications, Circuits and Systems and West Sino Expositions, IEEE, 2002. Jun. 29-Jul. 1, 2002, Piscataway, NJ, USA. vol. 1, pp. 170-171, XP010632240, ISBN: 0-7803-7547-5.http://ieeexplore.ieee.org/ie15/8402/26511/01180596.pdf"tp=&arnumber=1180596&isnumber=26511. Last accessed May 23, 2008, 2 pages.
Lucent Technologies: "MIMO system integration and signalling in HSDPA" 3GPP TSG RAN WG1, R1-01-0305, [Online] Feb. 27, 2001, XP002428085 Las Vegas, USA Retrieved from the Internet : URL:www.3gpp.org.
Preliminary Notice of Reasons for Rejection for Japanese Application No. 2008-537984, dated Mar. 15, 2011 (English Translation).
Qualcom Inc, IEEE 802.20 Working Group on Mobile Broadband Wireless Access. QFDD and QTDD: Proposed Draf Air Interface Specification. IEEE C802.20-05/69 dated Oct. 28, 2005, pp. 6-36-6-38, XP002424184. http://www.ieee802.org/20/Contribs. Last accessed Mar. 5, 2005.
Qualcom Inc: "IEEE 802.20 Working Group on Mobile Broadband Wireless Access; QFDD and QTDD: Proposed Draft Air Interface Specification; IEEE C802.20-05/69" dated Oct. 28. 2005, pp. 6-113-6-118, XP002423052. http://www.ieee802.org/20/Contribs.
Qualcomm Europe, "Description and link simulations of MIMO schemes for OFDMA based E-UTRA downlink evaluation," 3GPP TSG-RAN WG1#42, R1-050903, Sep. 2, 2005, URL: http://www.3gpp.org/ftp/tsg_ran/WG1_RL1/TSGR1_42/Docs/R1-050903.zip.
Qualcomm Europe, "Qualitative Evaluation of MIMO schemes for OFDM-based E-UTRA downlink," 3GPP TSG-RAN WG1 #42bis, R1-051267, Oct. 14, 2005, URL: http:/www.3gpp.org/ftp/tsg_ran/WG1_RL1/TSGR1_42bis/Docs/R1-051267.zip, 5 pages.
Qualcomm Inc. "IEEE 802.20 Working Group on Mobile Broadband Wireless Access; QFDD and QTDD: proposed Drafl Air Interface Specification" dated Oct. 28, 2005, pp. 6-13-6-33, XP002423356.
Qualcomm, Incorporated: "IEEE 802.20 Working Group on Mobile Broadband Wireless Access; QFDD and QTDD: Proposed Draft Air Interface Specification; IEEE C802.20-05/69" [Online] Oct. 28, 2005, pp. 6-1-6-12, XP002423187.
Qualcomm: "UHDR-One Connection Layer: Registration, Paging and Disc. Features" 3GPP2, [Online] Aug. 25, 2006, pp. 1-17, XP002429007.
Qualcomm,Incorporated: "IEEE 802.20 Working Group on Mobile Broadband Wireless Access; QFDD and QTDD: Proposed Draft Air Interface Specification; IEEE C802.20-05/69" [Online] Oct. 28, 2005, pp. 6-56-6-57, XP002424920 Retrieved from the Internet : URL: http://www. ieee802. org/20/Contribs/>.
Rosenberg, J., et al., "SIP: Session Initiation Protocol ; RFC 3261" Request for Comments: 3261, Jun. 2002, p. 1, 176,177,184-193, XP002423186.
Sandip Sarkar: "Qualcomm Proposal for 3GPP2 Physical Layer; Version 1.0; pp. 1-10, 72-74; C30-20060522-035 QC-Proposal-v1.0" Qualcomm; 3GPP2, [Online] May 22, 2006, XP002426839.
Soong, A. et al., "Forward High-Speed Wireless Packet Data Service in IS-2000—1xEV-DV," IEEE Communications Magazine, 41 (8), pp. 170-177, Aug. 2003.
Supplementary European Search Report—EP06773404—Search Authority—Hague—Jun. 24, 2011.
Taiwan Search Report—TW095121792—TIPO—Jan. 21, 2011.
Taiwan Search Report—TW095139658—TIPO—Aug. 25, 2011.
Taiwan Search Report—TW095139658—TIPO—Feb. 17, 2012.
Taiwan Search Report—TW095139658—TIPO—Apr. 25, 2013.
Taiwanese Search report—095121733—TIPO—Nov. 2, 2010.
Taiwanese Search Report—TW095108906—Search Authority—TIPO—Feb. 1, 2009.
Telecommunication Industry Association: Upper Layer (Layer 3) Signalling Standard for CDMA2000 Spread Spectrum Systems, Release C. TINEINIS-2000.5-C, May 2002, XP002423757.
Telecommunications Industry Association: Upper Layer (Layer 3) Signaling Standard for CDMA2000 Spread Spectrum Systems, Release C, (186 pages) chapters: 2.6.4.3,2.6.6.2.8,2.73..26..63,. TIA/EIA Interim Standard; TIA/EIA/IS-2000. 5-C, May 2002, XP002423446.
Telecommunications Industry Association. "Upper Layer (Layer3) Signaling Standard for cdma2000 Spread Spectrum Systems," TIA/EIA/IS-2000.5-A-1, Nov. 2000, published online at [http://www.tiaonline.org/standards/technology/cdma2000/documents/TIA-EIA-IS-2000-5-A-1.pdf] 11 pages.
TIA-EIA-IS-856, TIA/EIA Interim Standard, "cdma2000 High Rate Packet Data Air Interface Specification," Telecommunications Industry Association, Nov. 2000.
Tim Tomcik, et al. MBFDD and MBTDD: Proposed Draft Air Interface Specification. Chapter 6: Lower MAC Control Sublayer. IEEE 802.20 Working Access. XP002423758. w.ieee802.org/20/Contribs/C802.20-06-04.pdf. Last accessed Feb. 28, 2007.
Tomcik, et al., "QFDD and QTDD: Proposed Drafl Air Interface Specification, chapter 6, Lower MAC Control Sublayer". IEEE C802.20-25/69, XX, XX dated Oct. 28, 2005, pp. I-XXXI, 1, XP002423447.
Tomcik Jim, "C802.20-05/69: QFDD and QTDD: Proposed Draft Air Interface Specification". IEEE 802.20 contribution to session # 17 dated Oct. 28, 2005, XP002422176. http://ieee802.org/2O/contributions.html. Last accessed Feb. 27, 2007.
Turner, S. et al., "cdma 2000 Hybrid Access Terminal Operation", Announcement Qualcomm CDMA Technologies, San Diego, CA, USA, Apr. 9, 2001,pp. 1-25, XP002422171.
U.S. Appl. No. 60/731,037, filed Oct. 27, 2005, entitled "Methods and Apparatus for Providing Mobile Broadband Wireless Higher MAC", 148 pages.
Wonil Roh et. al. : "An Efficient CQICH Signaling for MIMO OFDMA" IEEE 802.16 Broadband Wireless Access Working Group, [Online] Aug. 31, 2004, XP002428096 Retrieved from the Internet : URL : www. ieee802. org/16/>.
Written Opinion—PCT/US06/009549, International Search Authority—European Patent Office—Jun. 20, 2006.
Written Opinion—PCT/US2006/041870, International Search Authority, European Patent Office, Apr. 16, 2007.
Written Opinion—PCT/US2006/041900, International Search Authority, European Patent Office, May 18, 2007.
Written Opinion—PCT/US2006/041908, International Search Authority, European Patent Office, Mar. 6, 2007.
Written Opinion—PCT/US2006/041914, International Search Authority, European Patent Office, Apr. 20, 2007.
Written Opinion—PCT/US2006/041921, International Search Authority, European Patent Office, Mar. 15, 2007.
Written Opinion—PCT/US2006/041933, International Search Authority, European Patent Office, Mar. 14, 2007.
Written Opinion—PCT/US2006/041942, International Search Authority, European Patent Office, Mar. 28, 2007.

(56) References Cited

OTHER PUBLICATIONS

Written Opinion—PCT/US2006/041946, International Search Authority, European Patent Office, Mar. 21, 2007.
Written Opinion—PCT/US2006/041961, International Search Authority, European Patent Office, Mar. 20, 2007.
Written Opinion—PCT/US2006/041981, International Search Authority, European Patent Office, Mar. 12, 2007.
Written Opinion—PCT/US2006/042012, International Search Authority, European Patent Office, Apr. 16, 2007.
Written Opinion—PCT/US2006/042023, International Search Authority, European Patent Office, Feb. 28, 2007.
Written Opinion—PCT/US2006/042067, International Search Authority, European Patent Office, Apr. 17, 2007.
Written Opinion—PCT/US2006/042310, International Search Authority, European Patent Office, Mar. 15, 2007.
Written Opinion—PCT/US2006/042313, International Search Authority, European Patent Office, Apr. 16, 2007.
Written Opinion—PCT/US2006/042325, International Search Authority, European Patent Office, Apr. 16, 2007.
Written Opinion—PCT/US2006/042418, International Search Authority, European Patent Office, Apr. 27, 2007.
Written Opinion dated Apr. 29, 2008, for PCT Application Serial No. PCT/US2006/042013, 11 pages.
Written Opinion—PCT/US06/023587—International Search Authority/US-01/11/07.
Qualcomm Europe: "MIMO proposal for MIMO-WCDMA evaluation", 3GPP TSG-RAN WG1#42, R1-050912, Aug. 29-Sep. 2, 2005, pp. 21.

* cited by examiner

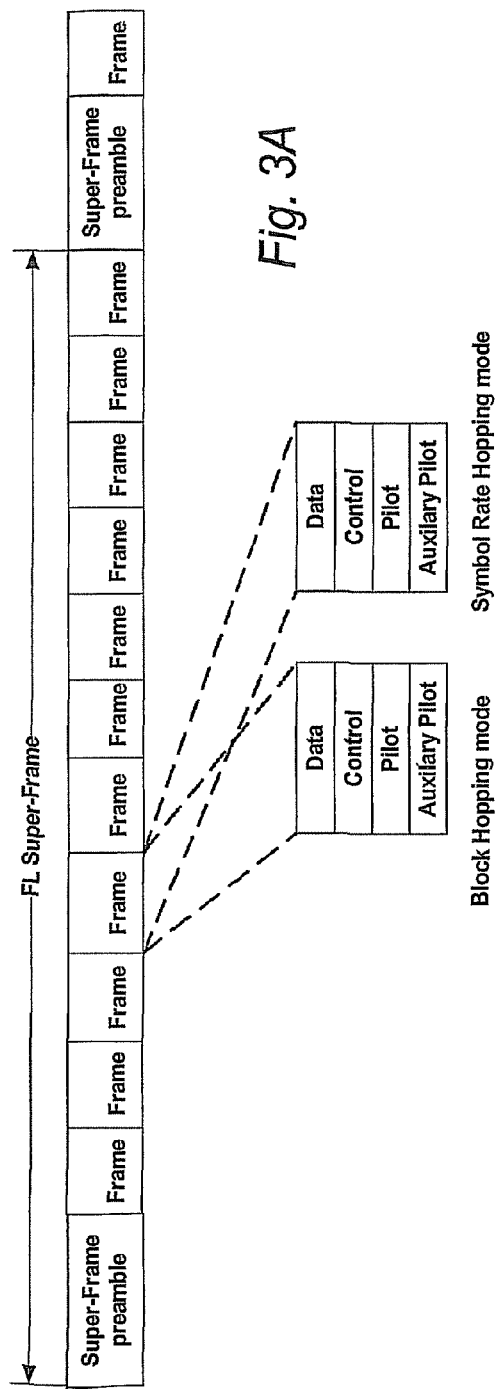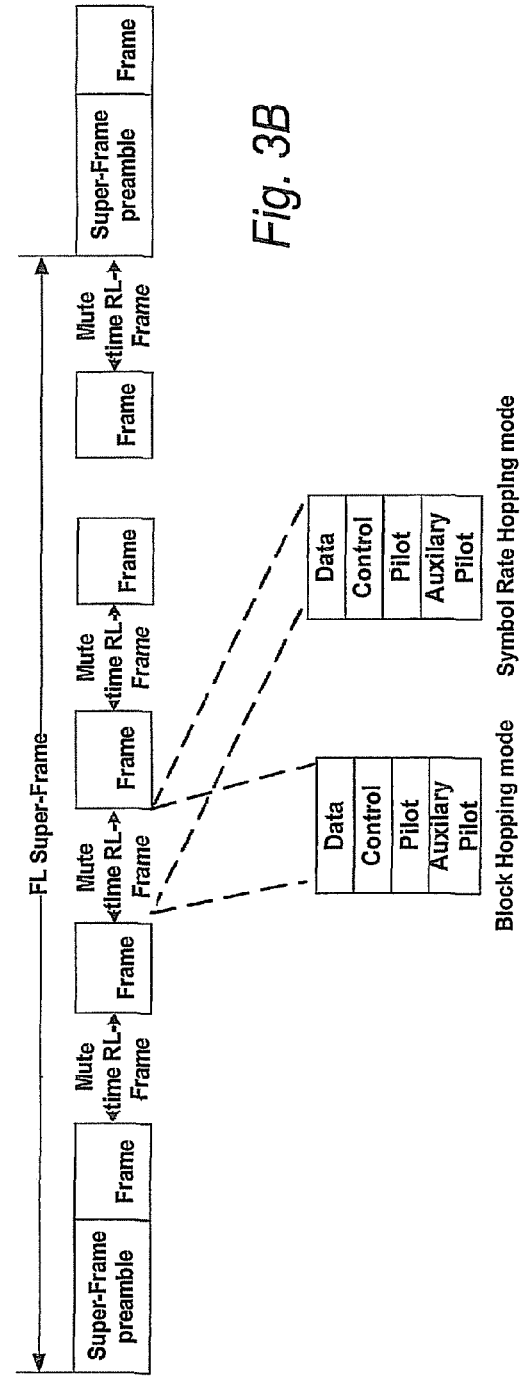

METHOD AND APPARATUS FOR SETTING REVERSE LINK CQI REPORTING MODES IN WIRELESS COMMUNICATION SYSTEM

CROSS-REFERENCE TO RELATED APPLICATIONS

This application is a continuation of U.S. application Ser. No. 13/082,136, entitled "METHOD AND APPARATUS FOR SETTING REVERSE LINK CQI REPORTING MODES IN WIRELESS COMMUNICATION SYSTEM" filed on Apr. 7, 2011, now U.S. Pat. No. 8,599,712 issued on Dec. 3, 2013, which is a continuation of U.S. patent application Ser. No. 12/091,482, entitled "METHOD AND APPARATUS FOR SETTTING REVERSE LINK CQI REPORTING MODES IN WIRELESS COMMUNICATION SYSTEM" filed on Oct. 27, 2006, now U.S. Pat. No. 7,924,800 issued on Apr. 12, 2011, which is a 371 of PCT Application Ser. No. PCT/US06/42302, filed Oct. 27, 2006, which claims priority to Provisional Application Ser. No. 60/731,037, entitled "METHODS AND APPARATUS FOR PROVIDING MOBILE BROADBAND WIRELESS HIGHER MAC" filed on Oct. 27, 2005, which are hereby incorporated herein in their entireties by reference.

BACKGROUND

1. Field

The present disclosure relates generally to wireless communication and more particularly to method and apparatus for setting Reverse link CQI Reporting Modes in an access terminal.

2. Background

Wireless communication systems have become a prevalent means by which a majority of people worldwide have come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

Wireless communication systems generally utilize different approaches to generate transmission resources in the form of channels. These systems may be code division multiplexing (CDM) systems, frequency division multiplexing (FDM) systems, and time division multiplexing (TDM) systems. One commonly utilized variant of FDM is orthogonal frequency division multiplexing (OFDM) that effectively partitions the overall system bandwidth into multiple orthogonal subcarriers. These subcarriers may also be referred to as tones, bins, and frequency channels. Each subcarrier can be modulated with data. With time division based techniques, each subcarrier can comprise a portion of sequential time slices or time slots. Each user may be provided with a one or more time slot and subcarrier combinations for transmitting and receiving information in a defined burst period or frame. The hopping schemes may generally be a symbol rate hopping scheme or a block hopping scheme.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and/or code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams transmitted from the base station. Likewise, a mobile terminal can transmit data to the base station or another mobile terminal. In these systems the bandwidth and other system resources are assigned utilizing a scheduler.

The signals, signal formats, signal exchanges, methods, processes, and techniques disclosed herein provide several advantages over known approaches. These include, for example, reduced signaling overhead, improved system throughput, increased signaling flexibility, reduced information processing, reduced transmission bandwidth, reduced bit processing, increased robustness, improved efficiency, and reduced transmission power

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an embodiment, a method is provided for setting Reverse Link CQI Reporting Modes in an access terminal, the method comprising determining a value for CQIReportingMode and setting reporting modes of the access terminal based on CQIReportingMode.

According to another embodiment, a computer-readable medium is described having a first set of instructions for determining a value for CQIReportingMode and a second set of instructions for setting reporting modes of the access terminal based on CQIReportingMode.

According to yet another embodiment, an apparatus operable in a wireless communication system is described which includes means for determining a value for CQIReportingMode and means for setting reporting modes of the access terminal based on CQIReportingMode.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

BRIEF DESCRIPTION OF THE DRAWINGS

FIGS. 3A and 3B illustrate aspects of superframe structures for a multiple access wireless communication system.

DETAILED DESCRIPTION

Figure 1:
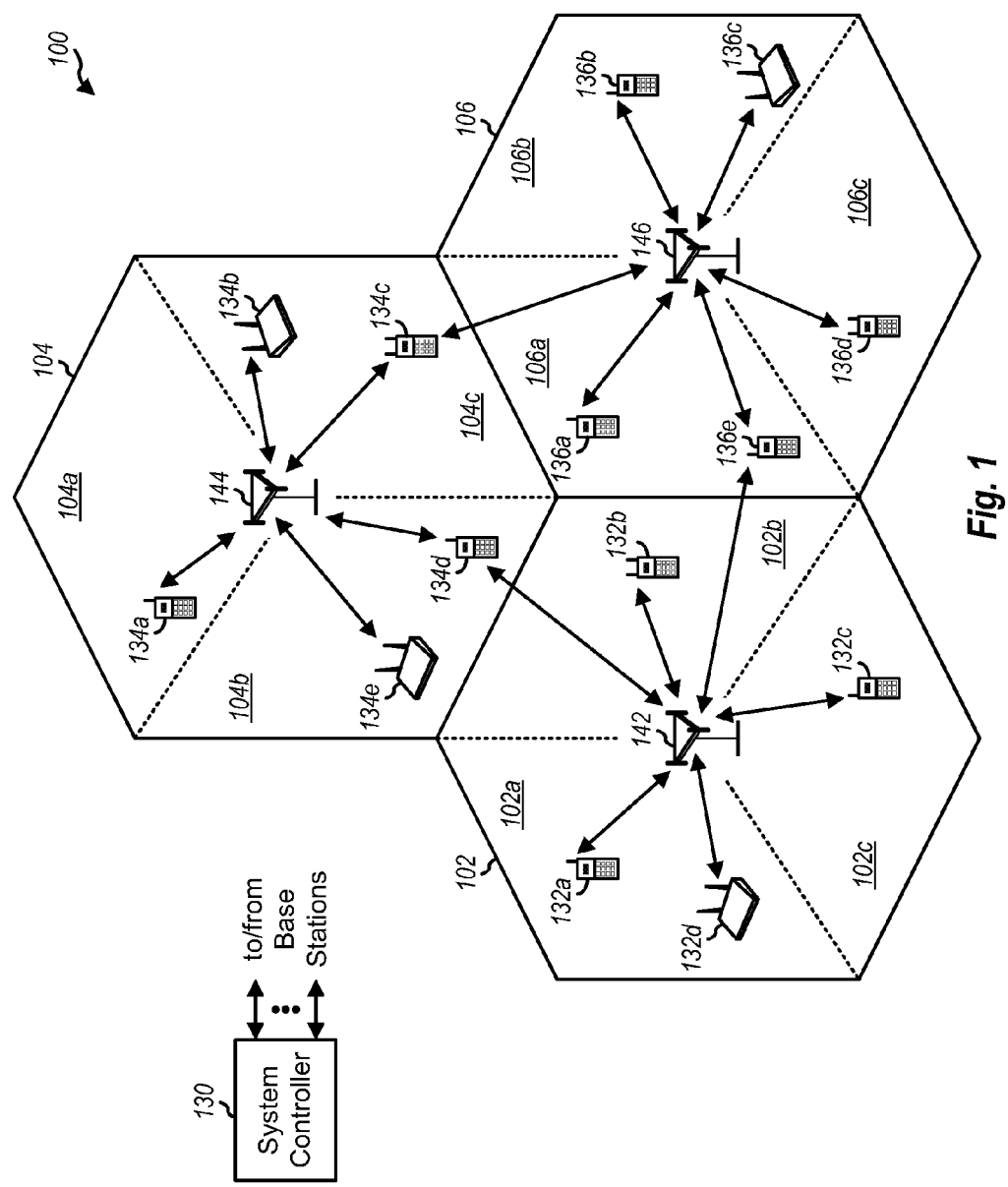
FIG. 1 illustrates aspects of a multiple access wireless communication system.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Referring to FIG. 1, a multiple access wireless communication system according to one aspect is illustrated. A multiple access wireless communication system 100 includes multiple cells, e.g. cells 102, 104, and 106. In the aspect of FIG. 1, each cell 102, 104, and 106 may include an access point 142, 144, and 146 that includes multiple sectors. The multiple sectors are formed by groups of antennas of a base station each responsible for communication with access terminals in a portion of the cell. In cell 102, access point 142 has sectors 102a, 102b, and 102c. In cell 104, access point 144 has sectors 104a, 104b, and 104c. In cell 106, access point 146 has sectors 106a, 106b, and 106c.

Each cell includes several access terminals which are in communication with one or more sectors of each access point. For example, access terminals 132a-132d, 134d, and 136e are in communication with base station 142, access terminals 134a-132e are in communication with access point 144, and access terminals 136a-136e and 134c are in communication with access point 146.

Controller 130 is coupled to each of the cells 102, 104, and 106. Controller 130 may contain one or more connections to multiple networks, e.g. the Internet, other packet based networks, or circuit switched voice networks that provide information to, and from, the access terminals in communication with the cells of the multiple access wireless communication system 100. The controller 130 includes, or is coupled with, a scheduler that schedules transmission from and to access terminals. In other aspects, the scheduler may reside in each individual cell, each sector of a cell, or a combination thereof.

As used herein, an access point may be a fixed station used for communicating with the terminals and may also be referred to as, and include some or all the functionality of, a base station, a Node B, or some other terminology. An access terminal may also be referred to as, and include some or all the functionality of, a user equipment (UE), a wireless communication device, terminal, a mobile station or some other terminology.

It should be noted that while FIG. 1, depicts physical sectors, i.e. having different antenna groups for different sectors, other approaches may be utilized. For example, utilizing multiple fixed "beams" that each cover different areas of the cell in frequency space may be utilized in lieu of, or in combination with physical sectors. Such an approach is depicted and disclosed in co-pending U.S. patent application Ser. No. 11/260,895, entitled "Adaptive Sectorization in Cellular System."

Figure 2:
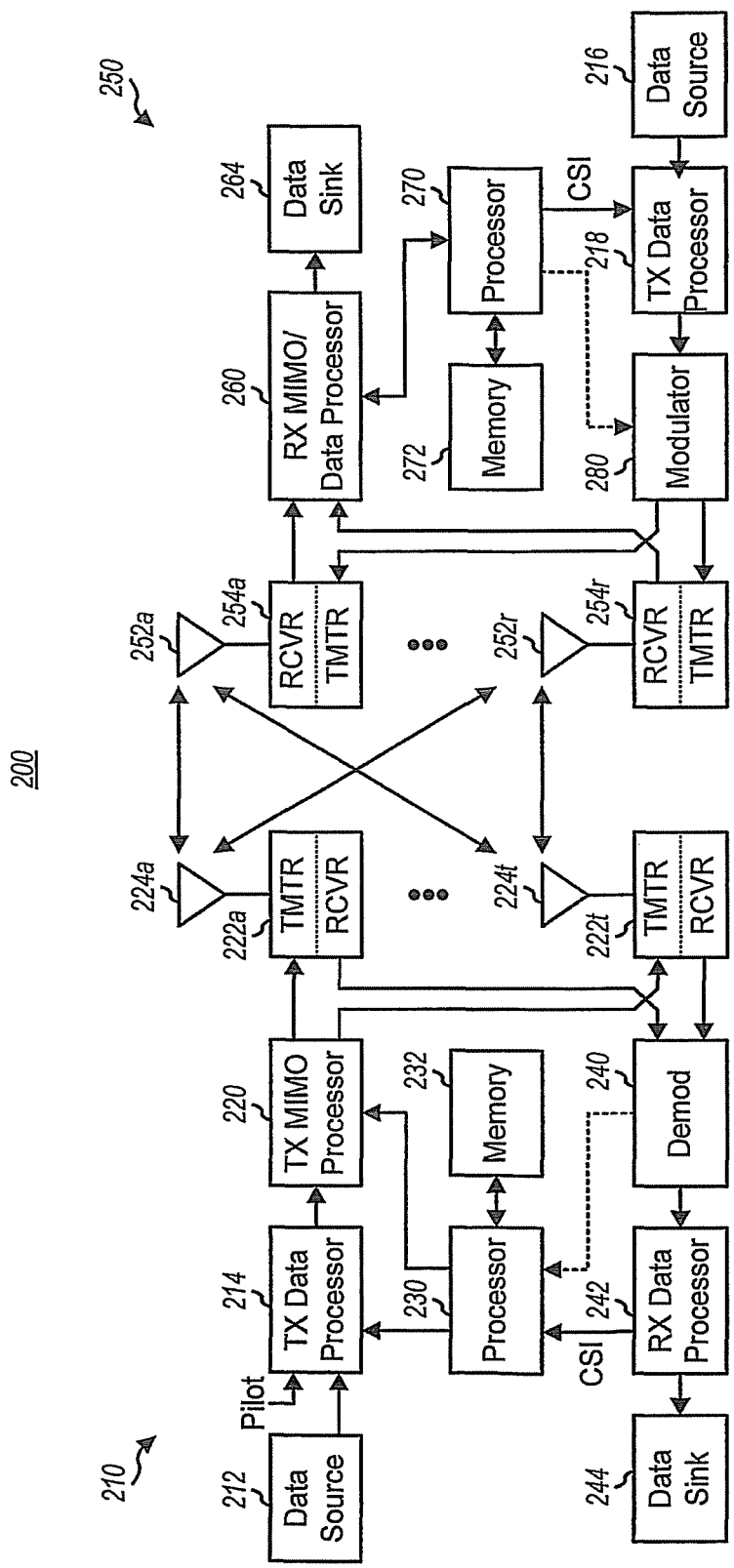
FIG. 2 illustrates aspects of a transmitter and receiver in a multiple access wireless communication system.

Referring to FIG. 2, a block diagram of an aspect of a transmitter system 210 and a receiver system 250 in a MIMO system 200 is illustrated. At transmitter system 210, traffic data for a number of data streams is provided from a data source 212 to transmit (TX) data processor 214. In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM, or other orthogonalization or non-orthogonalization techniques. The pilot data is typically a known data pattern that is processed in a known manner and may be used at the receiver system to estimate the channel response. The multiplexed pilot and coded data for each data stream is then modulated (i.e., symbol mapped) based on one or more particular modulation schemes (e.g., BPSK, QSPK, M-PSK, or M-QAM) selected for that data stream to provide modulation symbols. The data rate, coding, and modulation for each data stream may be determined by instructions performed on provided by processor 230.

The modulation symbols for all data streams are then provided to a TX processor 220, which may further process the modulation symbols (e.g., for OFDM). TX processor 220 then provides $N_T$ modulation symbol streams to $N_T$ transmitters (TMTR) 222a through 222t. Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The processing by RX data processor 260 is described in further detail below. Each detected symbol stream includes symbols that are estimates of the modulation symbols transmitted for the corresponding data stream. RX data processor 260 then demodulates, deinterleaves, and decodes each detected symbol stream to recover the traffic data for the data stream. RX data processor provides the traffic data to processor 270 and data sink 264. The processing by RX data processor 260 is complementary to that performed by TX processor 220 and TX data processor 214 at transmitter system 210.

RX data processor 260 may be limited in the number of subcarriers that it may simultaneously demodulate, e.g. 512 subcarriers or 5 MHz, and such a receiver should be scheduled on a single carrier. This limitation may be a function of its FFT range, e.g. sample rates at which the processor 260 may operate, the memory available for FFT, or other functions available for demodulation. Further, the greater the number of subcarriers utilized, the greater the expense of the access terminal.

The channel response estimate generated by RX processor 260 may be used to perform space, space/time processing at the receiver, adjust power levels, change modulation rates or schemes, or other actions. RX processor 260 may further estimate the signal-to-noise-and-interference ratios (SNRs) of the detected symbol streams, and possibly other channel characteristics, and provides these quantities to a processor 270. RX data processor 260 or processor 270 may further derive an estimate of the "operating" SNR for the system. Processor 270 then provides channel state information (CSI), which may comprise various types of information regarding the communication link and/or the received data stream. For example, the CSI may comprise only the operating SNR. In other aspects, the CSI may comprise a channel quality indicator (CQI), which may be a numerical value indicative of one or more channel conditions. The CSI is then processed by a TX data processor 278, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to recover the CSI reported by the receiver system. The reported CSI is then provided to processor 230 and data sink 244, and used to (1) determine the data rates and coding and modulation schemes to be used for the data streams and (2) generate various controls for TX data processor 214 and TX processor 220. Alternatively, the CSI may be utilized by processor 270 to determine modulation schemes and/or coding rates for transmission, along with other information. This may then be provided to the transmitter which uses this information, which may be quantized, to provide later transmissions to the receiver.

Processors 230 and 270 direct the operation at the transmitter and receiver systems, respectively. Memories 232 and 272 provide storage for program codes and data used by processors 230 and 270, respectively.

At the receiver, various processing techniques may be used to process the $N_R$ received signals to detect the $N_T$ transmitted symbol streams. These receiver processing techniques may be grouped into two primary categories (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

While FIG. 2 discusses a MIMO system, the same system may be applied to a multi-input single-output system where multiple transmit antennas, e.g. those on a base station, transmit one or more symbol streams to a single antenna device, e.g. a mobile station. Also, a single output to single input antenna system may be utilized in the same manner as described with respect to FIG. 2.

The transmission techniques described herein may be implemented by various means. For example, these techniques may be implemented in hardware, firmware, software, or a combination thereof. For a hardware implementation, the processing units at a transmitter may be implemented within one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic devices, other electronic units designed to perform the functions described herein, or a combination thereof. The processing units at a receiver may also be implemented within one or more ASICs, DSPs, processors, and so on.

For a software implementation, the transmission techniques may be implemented with modules (e.g., procedures, functions, and so on) that perform the functions described herein. The software codes may be stored in a memory (e.g., memory 230, 272x or 272y in FIG. 2) and executed by a processor (e.g., processor 232, 270x or 270y). The memory may be implemented within the processor or external to the processor.

It should be noted that the concept of channels herein refers to information or transmission types that may be transmitted by the access point or access terminal. It does not require or utilize fixed or predetermined blocks of subcarriers, time periods, or other resources dedicated to such transmissions.

Referring to FIGS. 3A and 3B, aspects of superframe structures for a multiple access wireless communication system are illustrated. FIG. 3A illustrates aspects of superframe structures for a frequency division duplexed (FDD) multiple access wireless communication system, while FIG. 3B illustrates aspects of superframe structures for a time division duplexed (TDD) multiple access wireless communication system. The superframe preamble may be transmitted separately for each carrier or may span all of the carriers of the sector.

In both FIGS. 3A and 3B, the forward link transmission is divided into units of superframes. A superframe may consist of a superframe preamble followed by a series of frames. In an FDD system, the reverse link and the forward link transmission may occupy different frequency bandwidths so that transmissions on the links do not, or for the most part do not, overlap on any frequency subcarriers. In a TDD system, N forward link frames and M reverse link frames define the number of sequential forward link and reverse link frames that may be continuously transmitted prior to allowing transmission of the opposite type of frame. It should be noted that the number of N and M may be vary within a given superframe or between superframes.

In both FDD and TDD systems each superframe may comprise a superframe preamble. In certain aspects, the superframe preamble includes a pilot channel that includes pilots that may be used for channel estimation by access terminals, a broadcast channel that includes configuration information that the access terminal may utilize to demodulate the information contained in the forward link frame. Further acquisition information such as timing and other information sufficient for an access terminal to communicate on one of the carriers and basic power control or offset information may also be included in the superframe preamble. In other cases, only some of the above and/or other information may be included in this superframe preamble.

As shown in FIGS. 3A and 3B, the superframe preamble is followed by a sequence of frames. Each frame may consist of a same or a different number of OFDM symbols, which may constitute a number of subcarriers that may simultaneously utilized for transmission over some defined period. Further, each frame may operate according to a symbol rate hopping mode, where one or more non-contiguous OFDM symbols are assigned to a user on a forward link or reverse link, or a block hopping mode, where users hop within a block of OFDM symbols. The actual blocks or OFDM symbols may or may not hop between frames.

Figure 4:
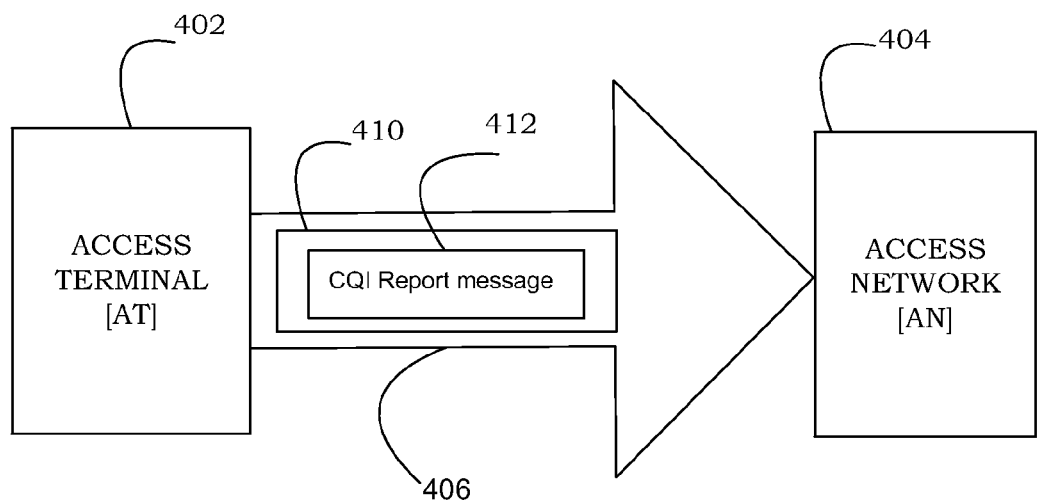
FIG. 4 illustrates aspect of communication between an access terminal and an access network

FIG. 4 illustrates communication between an access terminal 402 and an access network 404. The access terminal generates and transmits a CQIReport message 410 to the access network 404. Using a communication link 406 and based upon predetermined timing, system conditions, or other decision criteria, the access terminal 402 transmits block 410 to the access network 404. The communication link may be implemented using communication protocols/standards such as World Interoperability for Microwave Access (WiMAX), infrared protocols such as Infrared Data Association (IrDA), short-range wireless protocols/technologies, Bluetooth® technology, ZigBee® protocol, ultra wide band (UWB) protocol, home radio frequency (HomeRF), shared wireless access protocol (SWAP), wideband technology such as a wireless Ethernet compatibility alliance (WECA), wireless fidelity alliance (Wi-Fi Alliance), 802.11 network technology, public switched telephone network technology, public heterogeneous communications network technology such as the Internet, private wireless communications network, land mobile radio network, code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple (OFDM), orthogonal frequency division multiple access (OFDMA), orthogonal frequency division multiple FLASH (OFDM-FLASH), global system for mobile communications (GSM), single carrier (1×) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network.

The access terminal may support multiple reporting modes. The access terminal's reporting mode may be set based upon the CQIReportingMode value. The access terminal's CQIReportingMode can be one of Single Code Word CQI Reporting Mode, a Multiple Code Word CQI Reporting Mode, or a Single Input and Single Output (SISO) CQI Reporting Mode. The access terminal 402 is configured to transmit block 410 to the access network 404. The access terminal 402 may incorporate the message 410 into one or more data packets 412 which are transmitted on a forward link 406. In another aspect, the message 410 may be transmitted without being incorporated in to a packet. The data packet comprises header information that indicates whether the data packets 412 contain the CQIReport message 410. The data packet 412 is exchanged on the forward link 406 using one or more channels.

Figure 5A:
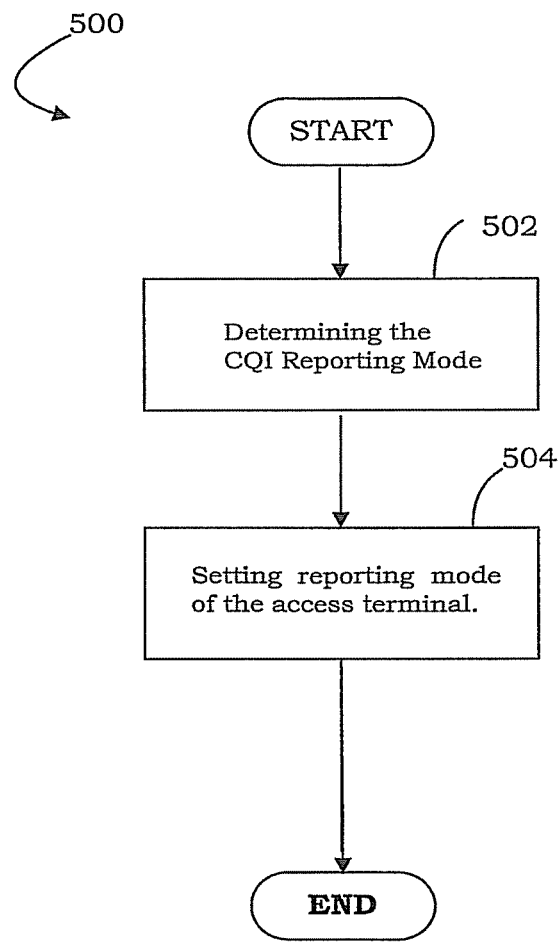
FIG. 5A illustrates a flow diagram of a process by an access terminal.

FIG. 5A illustrates a flow diagram of process 500, according to an embodiment. At 502, the CQIReportingMode value is determined. At 504, the reporting mode of the access terminal is set based upon the CQIReportingMode value i.e. the reporting mode of the access terminal is set to any one of Single Code Word CQI Reporting Mode, Multiple Code Word CQI Reporting Mode, or SISO CQI Reporting Mode.

Figure 5B:
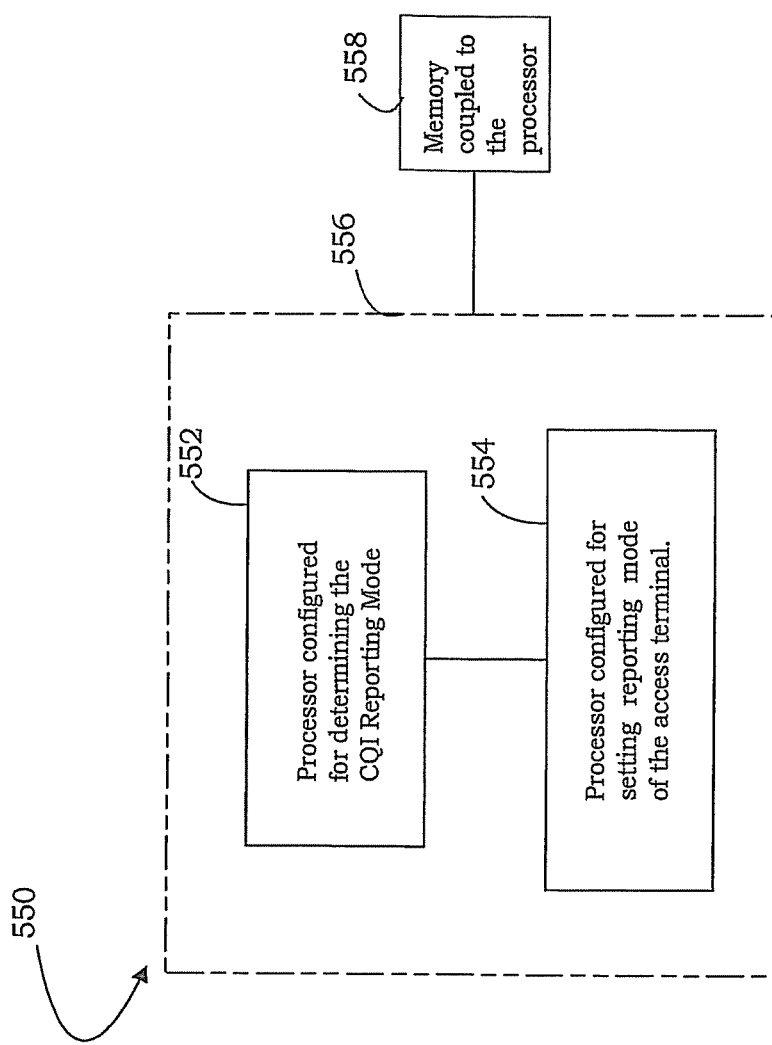
FIG. 5B illustrates one or more processors configured for setting Reverse Link CQI Reporting Mode in the access terminal.

FIG. 5B illustrates a processor 550 for setting Reverse Link CQI reporting mode in the access terminal. The processors referred to may be electronic devices and may comprise one or more processors configured for setting the reporting mode according to the embodiment. A processor 552 is configured for determining the CQIReportingMode value. A processor 554 is further configured for setting the reporting mode of the access terminal based upon the CQIReportingMode value i.e. the reporting mode of the access terminal is set to any one of Single Code Word CQI Reporting Mode, Multiple Code Word CQI Reporting Mode, or SISO CQI Reporting Mode. The functionality of the discrete processors 552 to 554 depicted in the figure may be combined into a single processor 556. A memory 558 is also coupled to the processor 556.

In an embodiment, an apparatus is described which includes a means for determining the CQIReportingMode value. A means is further provided for setting the reporting mode of the access terminal based upon the CQIReportingMode value i.e. the reporting mode of the access terminal is set to any one of Single Code Word CQI Reporting Mode, Multiple Code Word CQI Reporting Mode, or SISO CQI Reporting Mode. The means described herein may comprise one or more processors.

Furthermore, embodiments may be implemented by hardware, software, firmware, middleware, microcode, or any combination thereof. When implemented in software, firmware, middleware or microcode, the program code or code segments to perform the necessary tasks may be stored in a machine readable medium such as a separate storage(s) not shown. A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Various modifications to these aspects will be readily apparent to those skilled in the art, and the generic principles defined herein may be applied to other aspects. Thus, the description is not intended to be limited to the aspects shown herein but is to be accorded the widest scope consistent with the principles and novel features disclosed herein.

The invention claimed is:

1. A method of determining reverse link channel quality indicator (CQI) reporting modes of an access terminal, comprising:
   determining a CQI reporting mode value;
   identifying a reverse link CQI reporting mode from a group of reporting modes based, at least in part, on the CQI reporting mode value; and
   reporting CQI based, at least in part, on the identified reverse link CQI reporting mode to a base station.

2. The method of claim 1, wherein the reverse link CQI reporting mode comprises a plurality of fields that indicate a transmission characteristic.

3. The method of claim 2, wherein the CQI reporting mode value indicates a field of the plurality of fields of the reverse link CQI reporting mode.

4. The method of claim 2, wherein at least one field of the plurality of fields of the reverse link CQI reporting mode includes a rank that indicates a desired number of multiple input and multiple output (MIMO) layers.

5. The method of claim 2, wherein at least one field of the plurality of fields of the reverse link CQI reporting mode includes a preferred precoding matrix.

6. The method of claim 1, further comprising setting the reverse link CQI reporting mode of the access terminal to the identified reverse link CQI reporting mode.

7. The method of claim 1, wherein the reverse link CQI reporting mode comprises at least one of a single code word CQI reporting mode, a multiple code word CQI reporting mode, and a single input and single output (SISO) CQI reporting mode.

8. An apparatus for determining reverse link channel quality indicator (CQI) reporting modes, comprising:
　at least one processor configured to:
　　determine a CQI reporting mode value;
　　identify a reverse link CQI reporting mode from a group of reporting modes based, at least in part, on the CQI reporting mode value; and
　　report CQI based, at least in part, on the identified reverse link CQI reporting mode to a base station; and
　at least one memory configured to communicate with the at least one processor.

9. The apparatus of claim 8, wherein the reverse link CQI reporting mode comprises a plurality of fields that indicate a transmission characteristic.

10. The apparatus of claim 9, wherein the CQI reporting mode value indicates a field of the plurality of fields of the reverse link CQI reporting mode.

11. The apparatus of claim 9, wherein at least one field of the plurality of fields of the reverse link CQI reporting mode includes a rank that indicates a desired number of multiple input and multiple output (MIMO) layers.

12. The apparatus of claim 9, wherein at least one field of the plurality of fields of the reverse link CQI reporting mode includes a preferred precoding matrix.

13. The apparatus of claim 8, wherein the at least one processor is further configured to: set the reverse link CQI reporting mode of the access terminal to the identified reverse link CQI reporting mode.

14. The apparatus of claim 8, wherein the reverse link CQI reporting mode comprises at least one of a single code word CQI reporting mode, a multiple code word CQI reporting mode, and a single input and single output (SISO) CQI reporting mode.

15. An apparatus for determining reverse link channel quality indicator (CQI) reporting modes, comprising:
　means for determining a CQI reporting mode value;
　means for identifying a reverse link CQI reporting mode from a group of reporting modes based, at least in part, on the CQI reporting mode value; and
　means for reporting CQI based, at least in part, on the identified reverse link CQI reporting mode to a base station.

16. An apparatus for determining reverse link channel quality indicator (CQI) reporting modes of an access terminal, comprising:
　at least one processor;
　a non-transitory storage medium that is in communication with the at least one processor including instructions stored thereon, wherein the instructions cause the at least one processor to:
　　determine a CQI reporting mode value;
　　a reverse link CQI reporting mode from a group of reporting modes based, at least in part, on the CQI reporting mode value; and
　　report CQI based, at least in part, on the identified reverse link CQI reporting mode to a base station.

17. A non-transitory machine readable storage medium including instructions stored thereon, comprising:
　a first set of instructions for determining a CQI reporting mode value;
　a second set of instructions for identifying a reverse link CQI reporting mode from a group of reporting modes based, at least in part, on the CQI reporting mode value; and
　a third set of instructions for reporting CQI based, at least in part, on the identified reverse link CQI reporting mode to a base station.

* * * * *